United States Patent [19]

Uno et al.

[11] Patent Number: 5,765,040
[45] Date of Patent: Jun. 9, 1998

[54] DISK SUBSYSTEM USING A PAIR OF UNIDIRECTIONAL CONTROL LINES FOR EXCHANGING CONTROL INFORMATION IN BIT-SERIAL BETWEEN CONTROL DEVICE AND PLURAL DISK UNITS THROUGH UP/DOWN DIRECTIONS

[75] Inventors: Hiroshi Uno; Hiroyuki Tanaka, both of Kawasaki, Japan

[73] Assignee: Fujitsu Limited, Kawasaki, Japan

[21] Appl. No.: 432,469

[22] Filed: May 1, 1995

[30] Foreign Application Priority Data

Jun. 24, 1994 [JP] Japan ..................... 6-142784

[51] Int. Cl.⁶ .................................................. G06F 9/00
[52] U.S. Cl. ........................... 395/866; 395/481; 395/825
[58] Field of Search ..................... 333/12; 364/200, 364/900, 248.1; 375/220; 395/866, 825, 481

[56] References Cited

U.S. PATENT DOCUMENTS

| | | | |
|---|---|---|---|
| 3,697,896 | 10/1972 | Sarkozi et al. | 333/12 |
| 4,183,084 | 1/1980 | Lawson | 364/200 |
| 4,380,052 | 4/1983 | Shima | 364/900 |
| 4,747,047 | 5/1988 | Coogan et al. | 364/200 |
| 5,450,530 | 9/1995 | Snyder et al. | 375/220 |

FOREIGN PATENT DOCUMENTS

| | | |
|---|---|---|
| 0528060 | 2/1993 | European Pat. Off. . |
| 57-10855 | 1/1982 | Japan . |
| 63-55615 | 3/1988 | Japan . |
| 4-205988 | 7/1992 | Japan . |
| 4-259980 | 9/1992 | Japan . |
| 4-268280 | 9/1992 | Japan . |
| 4-274394 | 9/1992 | Japan . |
| 4-275095 | 9/1992 | Japan . |
| WO9201988 | 2/1992 | WIPO . |

OTHER PUBLICATIONS

"F6427H Magnetic Disk Subsystem: Hayabussa," Koike, et al., Fujitsu Sci. Tech. J., 26, 4, pp. 280–290, published in Feb. 1991.

Primary Examiner—Thomas C. Le
Assistant Examiner—David Ton
Attorney, Agent, or Firm—Greer, Burns & Crain, Ltd.

[57] ABSTRACT

Each one of intermediate control devices and n-number of disk drives are daisy-chain connected by control-information signal lines in each of downward and upward directions. Serial communication means (a driver and a receiver) sends and receives control information in the form of a bit serial between the intermediate control devices and each drive via the control-information signal lines in the downward and upward directions in accordance with a serial interface. This makes it possible to diminish the size of a magnetic disk apparatus by reducing the number of control-information signal lines and the numbers of drivers and receivers, and to cut down on power consumption so as to lower cost.

18 Claims, 23 Drawing Sheets

FIG. 8

| NAME | TAG OUT | | BUS OUT | | | | | | | | | MEANING |
|---|---|---|---|---|---|---|---|---|---|---|---|---|
| | BIT 0 | BIT 1 | 0 | 1 | 2 | 3 | 4 | 5 | 6 | 7 | | |
| DISCONNECT | 0 | 0 | 0 | 0 | 0 | 0 | $2^3$ | $2^2$ | $2^1$ | $2^0$ | DRIVE ADDRESS | DISCONNECT DK |
| SELECT | 0 | 1 | 0 | 0 | 0 | 0 | $2^3$ | $2^2$ | $2^1$ | $2^0$ | DRIVE ADDRESS | SELECT DK |
| | | | 1 | 0 | 0 | 0 | $2^3$ | $2^2$ | $2^1$ | $2^0$ | DRIVE ADDRESS | SELECT DK BY POLLING |
| COMMAND GATE | 1 | 0 | | | | COMMAND CODE | | | | | | COMMAND |
| SYNC-OUT | 1 | 1 | | | | MODIFIER DATA | | | | | | |

FIG. 9

| NAME | TAG IN | | BUS IN | | | | | | | | | MEANING |
|---|---|---|---|---|---|---|---|---|---|---|---|---|
| | BIT 0 | BIT 1 | 0 | 1 | 2 | 3 | 4 | 5 | 6 | 7 | | |
| SELECT-IN | 1 | 0 | 0 | 0 | 0 | 0 | $2^3$ | $2^2$ | $2^1$ | $2^0$ | SELECT-TAG RESPONSE |
| | | | | | | | \multicolumn{4}{c}{DRIVE ADDRESS} | | |
| | | | F | 0 | 0 | 0 | $2^3$ | $2^2$ | $2^1$ | $2^0$ | POLLING RESPONSE F:INTERRUPT FLAG |
| | | | | | | | \multicolumn{4}{c}{DRIVE ADDRESS} | | |
| SYNC-IN | 0 | 1 | \multicolumn{8}{c}{MACHINE STATUS} | | SYNC-OUT TAG RESPONSE |
| END OPERATION | 0 | 0 | \multicolumn{8}{c}{MACHINE STATUS} | | ERROR NOTIFICATION |
| VALID | 1 | 1 | \multicolumn{8}{c}{MACHINE STATUS} | | COMMAND-GATE TAG RESPONSE |

FIG.10
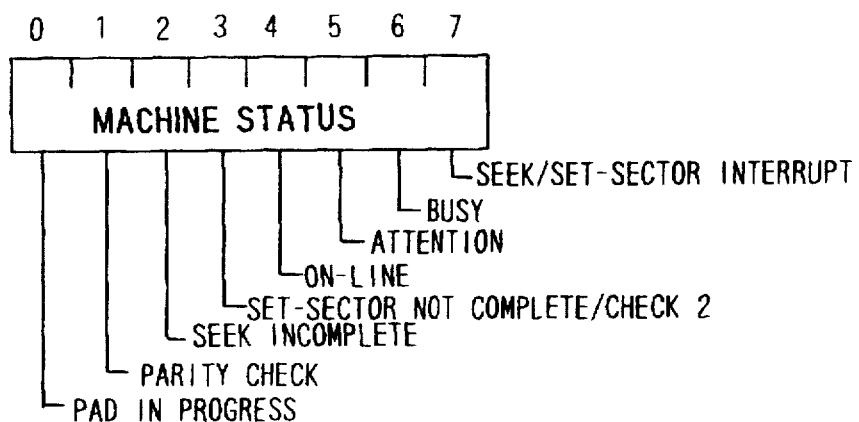
FIG.11A
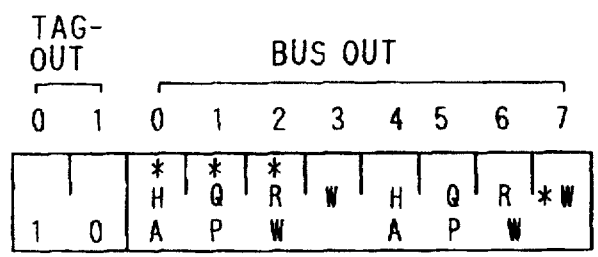
FIG.11B
| RW | *W | MEANING |
|---|---|---|
| ON(HIGH) | OFF(HIGH) | READ |
| ON(HIGH) | ON (LOW) | WRITE |

FIG.18A
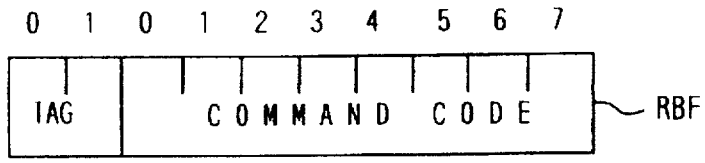
FIG.18B
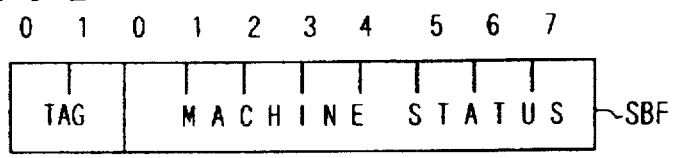
FIG.18C
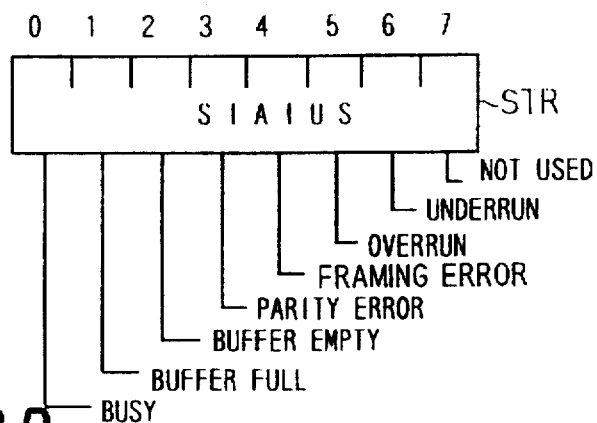
FIG.18D
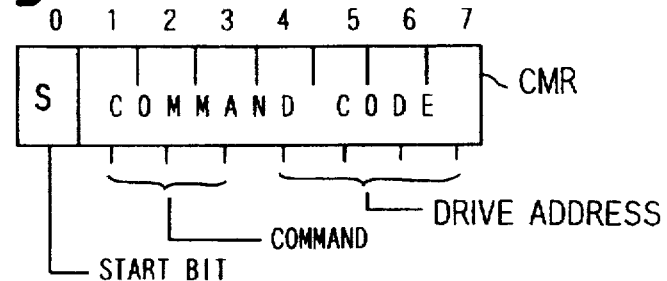
FIG.18E
| 8X | AUTO-POLLING(WITHOUT INTERRUPT) |
|----|-----|
| CX | AUTO-POLLING(WITH INTERRUPT) |
| A0 | SEND |
| 90 | RECEIVE |

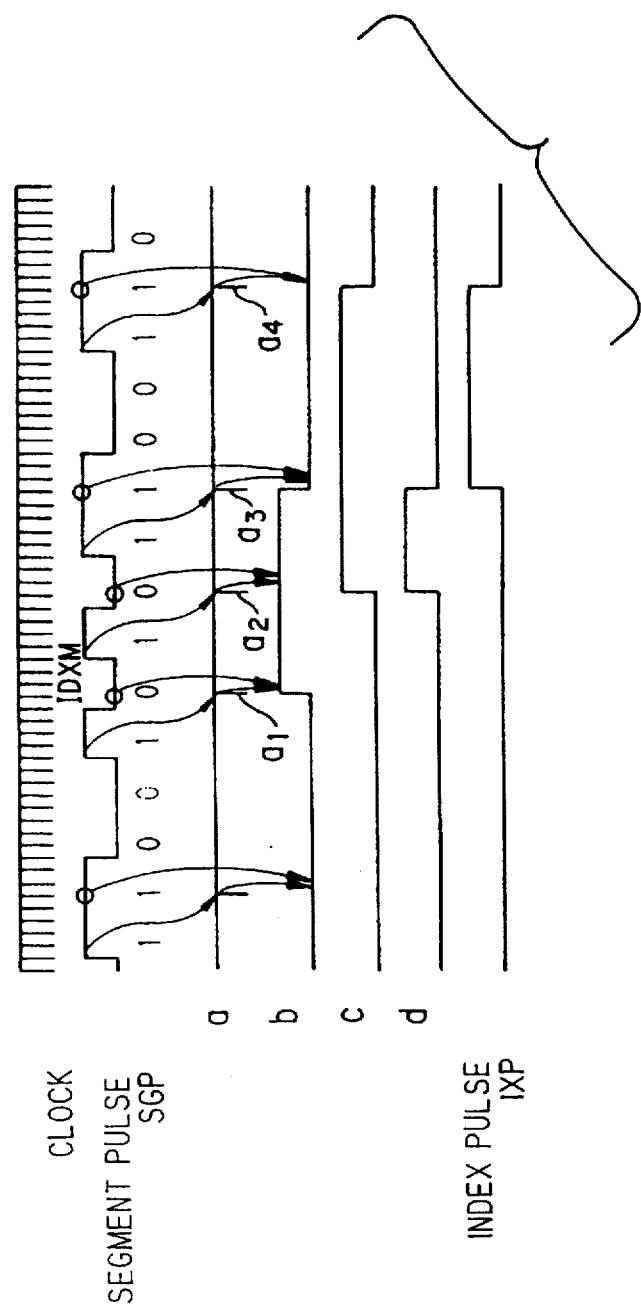

DISK SUBSYSTEM USING A PAIR OF UNIDIRECTIONAL CONTROL LINES FOR EXCHANGING CONTROL INFORMATION IN BIT-SERIAL BETWEEN CONTROL DEVICE AND PLURAL DISK UNITS THROUGH UP/DOWN DIRECTIONS

BACKGROUND OF THE INVENTION

This invention relates to a disk apparatus and disk subsystem. More particularly, the invention relates to a disk apparatus and disk subsystem so adapted that control information is sent and received between a disk drive and a controller in accordance with a serial interface to reduce cables, drivers and receivers.

A storage disk apparatus such as a magnetic disk apparatus and optical disk apparatus is utilized widely as the external storage apparatus of an electronic computer system.

A magnetic disk apparatus is equipped with n-number of disk drives for accessing disks in accordance with a command from a host controller. A disk subsystem which uses such a magnetic disk apparatus as an I/O unit is equipped with (1) a number of disk drives DK, (2) a disk controller DKC, which is connected to a higher order device such as a channel, for controlling writing of data to the disk drives and reading of data from the disk drives, and (3) a disk switcher DKSW, which is an intermediate control device provided between the disk drives DK and the disk controller DKC.

Each disk drive DK has a head disk assembly HDA, a control circuit unit, a power supply unit and a cooling mechanism. Further, each disk drive DK is connected to the intermediate control device DKSW by (1) an interface cable for sending/receiving control information, (2) one bidirectional serial interface cable for transmitting read/write data, and (3) a signal line for servo clock transmission synchronized to rotation of the head disk assembly HDA. The intermediate control device DKSW, which is connected to the disk controller DKC, performs disk access by exchanging control information with a disk drive in accordance with a command from the disk controller DKC.

FIG. 26 is a diagram illustrating the overall configuration of a magnetic disk subsystem, hosts and channels. Specifically, hosts (HOST) are shown at $1_1$, $1_2$, channels devices (CH) at $2_1$~$2_4$ and a magnetic disk subsystem at 3. The magnetic disk subsystem 3 includes disk controllers (DKC) $3a_1$~$3a_4$ connected to the channels $2_1$~$2_4$, respectively, intermediate control devices (DKSW) $3b_1$~$3b_4$ and disk drives (#0–#31) $3c_0$ $3c_{31}$.

Each of the disk drives $3c_0$~$3c_{31}$ has four device cross-call paths so as to be accessible from the four disk controllers DKC. The cross-call paths are provided for the purpose of improving accessing efficiency. With the progress that has been made in reducing disk diameter, it is now possible to increase the number of disk drives accommodated in a single locker. One locker usually accommodates 16 disk drives (#0–#15; #16–#31), and two lockers construct one string. Each of the intermediate control devices $3b_1$~$3b_4$ is equipped with four interface cables $C_{ij}$ (i=1~4, j=1~4). Each of the intermediate control devices $3b_j$ (i=1~4) is connected to eight disk drives (#0–#7; #8–#15, #16–#23; #24–#31) for each one of its four interface cables $C_{ij}$ (j=1~4) via a mother board in the form of a printed circuit board.

FIG. 27 is a detailed connection diagram showing the manner in which each of the intermediate control devices $3b_1$~$3b_4$ is connected to the disk drives $3c_0$~$3c_{31}$ by the interface cables $C_{ij}$ (i=1~4, j=1~4).

The interface cables $C_{ij}$ (i=1~4, j=1~4) are parallel-type interface cables each having 19 signal lines. Nine of these 19 signal lines are bus lines (inclusive of parity), five are tag lines and the remaining five are control lines. In addition to the connection provided by the interface cables $C_{ij}$ (i=1~4, j=1~4), each intermediate control device is connected to the disk drives also by one bidirectional serial interface cable for transmission of read/write data and a signal line for servo-clock transmission synchronized to rotation of the HDA. This cable and signal line are not illustrated.

The recent increase in use of disk drives in great quantities has resulted in these apparatus occupying a greater proportion of the computer room and a reduction in the floor space occupied by a magnetic disk apparatus is now strongly required. To accomplish this, an increase in the number of disk drives installed within the magnetic disk apparatus, as well as a higher mounting density, is keenly sought. Accordingly, the disk drives are made smaller in size and a mounting structure is so contrived as to allow 16 disk drives to fit into one locker, as mentioned above.

The total number of interface cables in such a clustered magnetic disk apparatus is as high as 128, namely four paths multiplied by 32 disk drives. The interface cables therefore occupy a greater proportion of the interior of the locker. This is an impediment to any further reduction in the size of the clustered magnetic disk apparatus. In particular, since each interface cable has 19 signal lines, as mentioned above, the cables are thick and come to occupy a large share of the locker interior. Furthermore, since the number of signal lines is very large, large numbers of drivers and receivers are required.

Since a large proportion of the locker interior is thus occupied by the interface cables, the end result is an apparatus of larger size and higher cost. In addition, the attendant connectors also occupy a large share of the locker interior, and this also contributes to a larger and more expensive apparatus.

Furthermore, the large number of drivers and receivers lead to increase power consumption and higher cost.

SUMMARY OF THE INVENTION

Accordingly, a first object of the present invention is to provide a disk apparatus and disk subsystem whereby the number of control information lines can be reduced and connectors for connecting the lines can be made more compact.

A second object of the present invention is to provide a disk apparatus and disk subsystem in which floor space needed for installation can be reduced.

A third object of the present invention is to provide a disk apparatus and disk subsystem whereby the number of drivers and receivers in the disk apparatus can be reduced by a wide margin and power consumption can be curtailed to hold down costs.

A fourth object of the present invention is to provide a disk apparatus and disk subsystem in which reliability can be improved even in serial transmission.

According to the present invention, the foregoing objects are attained by providing a disk apparatus comprising downward and upward control-information signal lines of m paths for daisy-chain connecting each control device of m-number of control devices with n-number of disk drives in each of downward and upward directions and transmitting control information in the form of a bit serial between the control devices and the disk drives, and serial communication means provided in each disk drive for sending and receiving the control information to and from the control devices via the control-information signal lines in accordance with a serial interface.

Further, according to the present invention, the foregoing objects are attained by providing a disk subsystem having a disk apparatus equipped with n-number of disk drives which access disks in accordance with a command from a control device, and m-number of higher order control devices for controlling the disk drives by sending and receiving control information to and from the disk drives, the disk subsystem comprising control-information signal lines for daisy-chain connecting each control device with n-number of disk drives in each of downward and upward directions and transmitting the control information in the form of a bit serial in the downward and upward directions, and serial communication means provided in each control device and in each disk drive for sending and receiving the control information back and forth between the control devices and the disk drives via the control-information signal lines in the downward and upward directions in accordance with a serial interface.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram for describing the definition of each bit on an out-line;

FIG. 9 is a diagram for describing the definition of each bit on an in-line;

FIG. 10 is a diagram for describing types of machine status;

FIGS. 11A, 11B are diagram for describing the definition of bits in a read/write command;

FIG. 18A through 18E are diagrams for describing various registers, buffers and commands;

FIG. 19 is a waveform diagram for describing the operation of an index detecting circuit;

DESCRIPTION OF THE PREFERRED EMBODIMENTS (a) Overview of the invention

Figure 1:
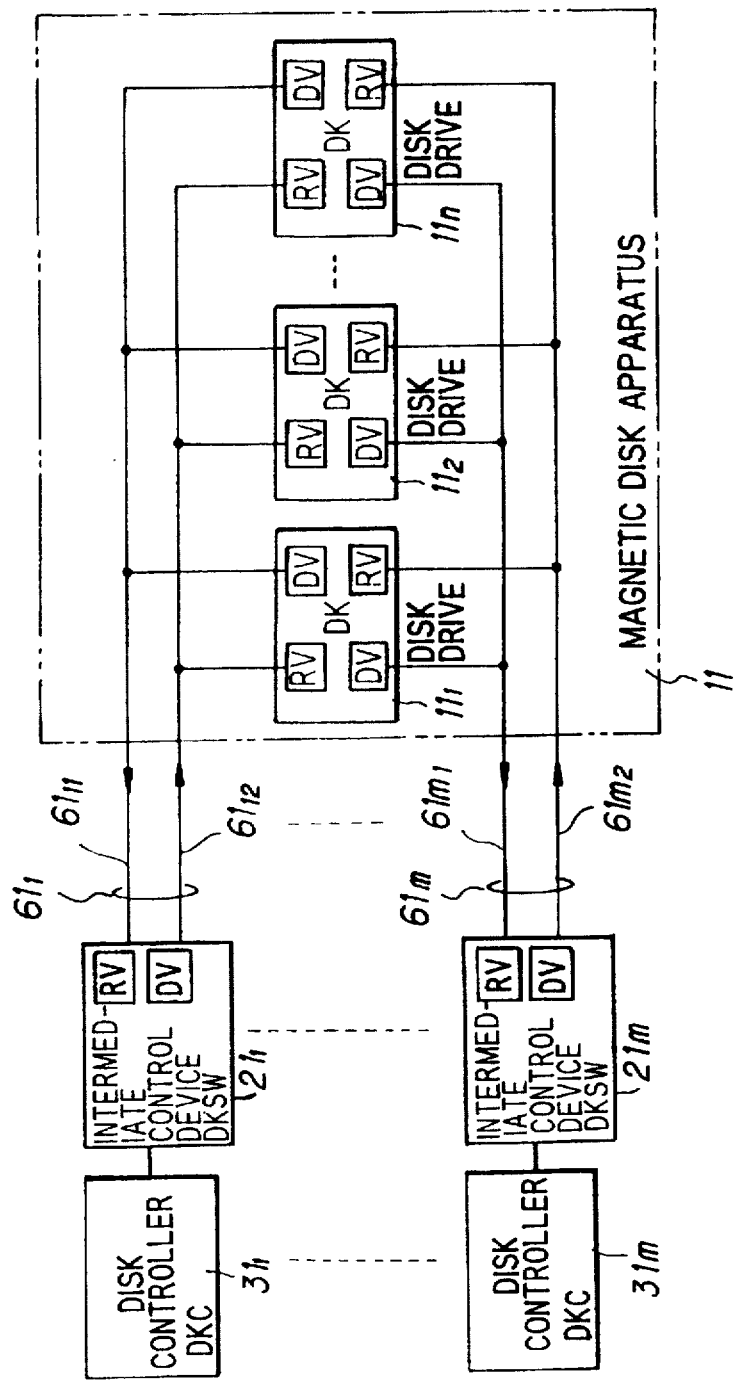
FIG. 1 is a block diagram for describing an overview of the present invention.

FIG. 1 is a block diagram for describing an overview of the present invention.

Numeral 11 denotes a magnetic disk apparatus having n-number of disk drives (DK) $11_1 \sim 11_n$ which access disks (not shown) in accordance with a command from a high order unit. Numerals $21_1 \sim 21_m$ denote m-number of intermediate control devices or disk switchers (DKSW) for controlling the disk drives (DK) $11_1 \sim 11_n$ by sending and receiving control information to and from these disk drives. Also shown are disk controllers (DKC) $31_1 \sim 31_m$, interface cables $61_i$ (i=1~m) and control-information signal lines $61_{i1}$, $61_{i2}$ for daisy-chain connecting the intermediate control devices $21_i$ (i=1~m) with the n-number of disk drives $11_1 \sim 11_n$ in each of downward and upward directions and transmitting control information in the downward and upward directions in the form of a bit serial. A driver DV and a receiver RV are provided in each of the intermediate control devices DKSW, and drivers DV and receivers RV are provided in each of the disk drives DK. The drivers and receivers are for sending and receiving control information between the intermediate control devices DKSW and each of the disk drives DK via the control-information signal lines $61_{i1}$, $61_{i2}$ in the downward and upward directions in accordance with a serial interface.

Each of the intermediate control devices DKSW is daisy-chain connected to the n-number disk drives DK by the control-information signal lines $61_{i1}$, $61_{i2}$ in each of the downward and upward directions. The serial communication means (the drivers and receivers) send and receive the control information in the form of a bit serial between the intermediate control devices DKSW and each of the disk drives DK via the downward and upward control-information signal lines in accordance with the serial interface. If this arrangement is adopted, each interface cable $61_i$ connected to the disk drives DK can consist of two control signal lines, thereby making it possible to greatly reduce the number of signal lines and to reduce the size of the magnetic disk apparatus. The number of drivers in each disk drive DK need be only one per interface cable, and the number of receivers need be only one per interface cable. As a result, the numbers of drivers and receivers can be greatly reduced, power consumption can be curtailed and costs can be kept low. Furthermore, since the number of signal lines in the interface cables is small, connectors can be made compact. This makes it possible to reduce the size of the magnetic disk apparatus even further.

Interface cables of m (=4) paths connected to each disk drive DK are divided into s (=2) sets, one connector is provided for each set and m/s (=2) intermediate control devices are connected to one disk drive via each connector. This arrangement enhances reliability because even if one connector makes poor contact, the disk drive can still be accessed via the other normal connector.

One connector is provided for all of the interface cables connected to each disk drive DK, and the disk drive is so arranged that the connector on the disk-drive side is connected by being plugged into the connector on the signal-line side. By adopting such a plug-in connection, the connector can be prevented from being pulled out and it is possible to obtain a high reliability even through use of a single connector.

The control-information signal lines $61_{11}$, $61_{12}$ which daisy-chain connect the intermediate control devices DKSW and the disk drives DK are constituted by differential balanced-type transmission lines. Adopting differential balanced-type transmission lines makes it possible to reduce the occurrence of error due to noise, thereby enhancing the reliability of the system. Further, the control information sent and received between the intermediate control device DKSW and disk drive DK is composed of a string of data bits and a start bit placed at the head of the string. The bit string is received on the receiving side in synchronized fashion by start-stop synchronization. In this case, one bit can be formed to have a width which is four times the clock width (32 times in ordinary start-stop synchronization). This makes it possible to reduce bit width and raise transmission speed.

In a case where the intermediate control device (DKSW) $21_i$ reads and writes data, the DKSW transmits a start read/write command to the prescribed disk drive DK via the downward control signal line $61_{i2}$. Upon receiving the start read/write command, the disk drive DK sends a valid tag to the intermediate control device $21_i$ via the upward control signal line $61_{i1}$ if an error has not occurred. Upon receiving the valid tag, the intermediate control device $21_i$ sends a read/write command to the disk drive DK via the downward control signal line $61_{i2}$ to read data from or write data to the disk. By thus sending and receiving the read/write command after the sending and receiving of the start read/write command, it is possible to prevent the erroneous writing of data that can be caused by interface malfunction.

Further, the disk drive DK transmits segment pulse to the intermediate control device DKSW in response to reception of the read/write command. Whenever it receives a segment pulse, the intermediate control device DKSW sends the read/write command to the disk drive DK until the reading/writing of data ends. The disk drive DK halts the transmission of segment pulse in response to termination of the read/write command. By thus making a judgment concerning continuance of the read/write operation whenever a segment pulse is received, it is possible to prevent a situation in which necessary data is erased owing to abnormal continuation of the write state at the time of some malfunction.

If an error occurs in response to issuance of the read/write command, the disk drive DK suspends transmission of the segment pulse and holds the upward control signal line $61_{i1}$ at the high logic level to notify the intermediate control device DKSW of the fact that an error has occurred in response to the read/write command. By adopting this arrangement, the intermediate control device DKSW is capable of immediately recognizing the occurrence of the error in response to the read/write command and of halting the read/write operation.

The disk drive DK attaches an index mark, which indicates the beginning of a track, to the segment pulse before sending these pulses to the intermediate control device DKSW. The latter identifies the beginning of a track by sensing the index mark from among the segment pulse. If this arrangement is adopted, the beginning of a track can be identified on the basis of an index mark. This makes it possible to write in home-address information HA of the beginning of the track in reliable fashion. Further, in a case where the reading/writing of data is performed over a plurality of tracks, incrementing of the head address can be designated by sensing the index mark, thereby making it possible to perform the reading/writing of data upon changing over the head.

The intermediate control device DKSW issues the read/write command to the disk drive DK in the form of a two-bit combination. Writing of data mistakenly can be prevented by thus commanding the write operation by a combination of two bits. In this case, the effect of preventing erroneous writing due to malfunction can enhanced by making the logic levels of the two bits of the command the reverse of each other in terms of logic. Along with each bit representing the read/write command, a bit which is the reverse signal of the bit is transmitted to the disk drive DV at the same time. The disk drive DK checks to determine whether the bits of each of the two sets are the reverse of each other. If the two bits are not the reverse of each other, then an error is judged to have occurred and this is transmitted to the intermediate control device DKSW as machine-status information. By adopting this arrangement, the effect of preventing erroneous write is enhanced even further.

When an index mark is sensed and the read/write operation continues, the intermediate control device DKSW designates head advance by a specific bit of the read/write command. When head advance has been designated, the disk drive DV increments the present head address, which has been stored in a head-address register, to perform the reading/writing of data with respect to the next track. If this is adopted, the head is changed over to read/write data continuously even in a case where the read/write operation is performed over more than one track.

When the device is idle, the intermediate control device DKSW sends a polling tag to each of the disk drives DK in succession via the downward control signal line. Each disk drive DK responds automatically to the polling tag by transmitting its own interrupt state to the intermediate control device DKSW via the upward control signal line. By adopting this arrangement, the intermediate control device DKSW is capable of recognizing, on the basis the interrupt, the end of the operation designated for the disk drive DK or the ready state of the disk drive DK. In this case, the intermediate control device DKSW performs monitoring to determine whether there is a response a prescribed period of time after the transmission of the polling tag. If there is no response, the intermediate control device DKSW judges that the disk apparatus DK does not exist and then sends the polling tag to the next disk drive DK. In a case where time is needed for the operation designated for the disk drive DK, the intermediate control device DKSW disconnects the disk drive DK and raises the order of priority of polling with respect to the disconnected disk drive DK. If this arrangement is adopted, the completion of the operation performed by the disconnected disk drive DK can be recognized promptly.

(b) Magnetic disk subsystem

Figure 2:
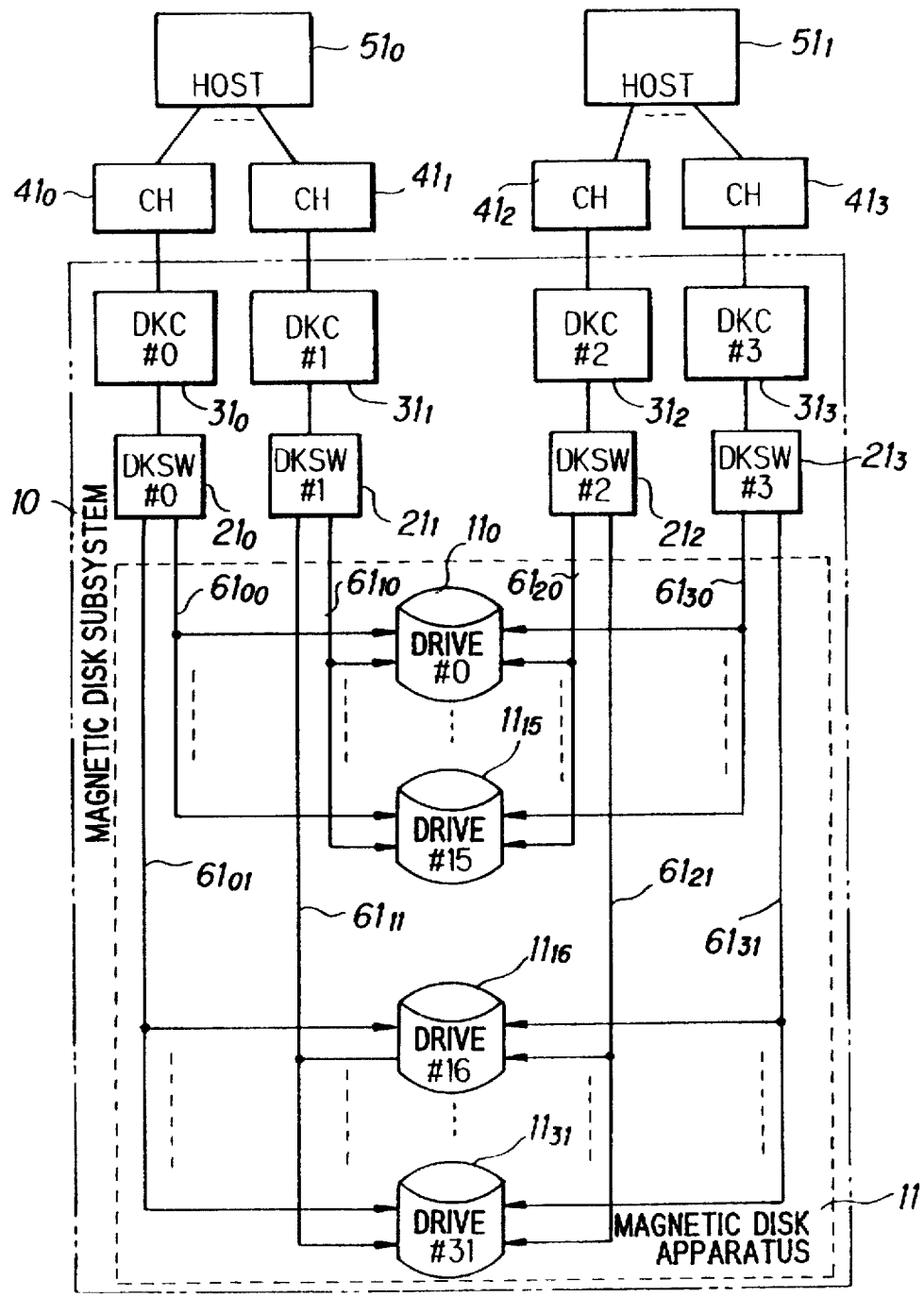
FIG. 2 is a block diagram showing the configuration of a magnetic disk subsystem according to the present invention.

FIG. 2 is a block diagram showing the configuration of a magnetic disk subsystem according to the present invention. This arrangement includes hosts and channel devices.

The magnetic disk subsystem, shown at numeral 10, includes a magnetic disk apparatus 11 equipped with n-number (n=32 in FIG. 2) of disk drives (DK) $11_0 \sim 11_{31}$ which access disks in accordance with a command from a host. Numerals $21_0 \sim 21_3$ denote m-number (m=4) of intermediate control devices (DKSW) for controlling the disk drives by sending and receiving control information to and from the disk drives $11_0 \sim 11_{31}$. Numerals $31_0 \sim 31_3$ denote disk controllers (DKC). Channel devices are shown at $41_0 \sim 41_3$ and hosts at $51_0 \sim 51_1$.

The disk apparatus (DK) $11_0 \sim 11_{15}$ are connected to the intermediate control devices (DKSW) $21_0 \sim 21_3$ by four device cross-call paths (interface cables) $61_{00} \sim 61_{30}$, and the disk apparatus (DK) $11_{16} \sim 11_{31}$ are connected to the intermediate control devices (DKSW) $21_0 \sim 21_3$ by four device cross-call paths (interface cables) $61_{01} \sim 61_{31}$.

The intermediate control devices (DKSW) $21_0 \sim 21_3$ are connected to the four disk controllers (DKC) $31_0 \sim 31_3$, respectively. Further, each of the intermediate control devices $21_i$ (i=0~3) is connected to each of the 16 disk drives (#0–#15, #16–#31) via two interface cables $61_{ij}$ (j=0~1).

Owing to the above-described connections, each disk controller (DKC) $31_i$ (i=0~3) is capable of accessing each of the disk drives $11_0 \sim 11_{31}$ via the corresponding intermediate control device (DKSW) $21_i$. The 16 disk drives (DK) $11_0 \sim 11_{15}$ are housed in a single locker, as will be described later, and the remaining 16 disk drives (DK) $11_{16} \sim 11_{31}$ are housed in a separate locker.

(c) Connection of interface cables

Figure 3:
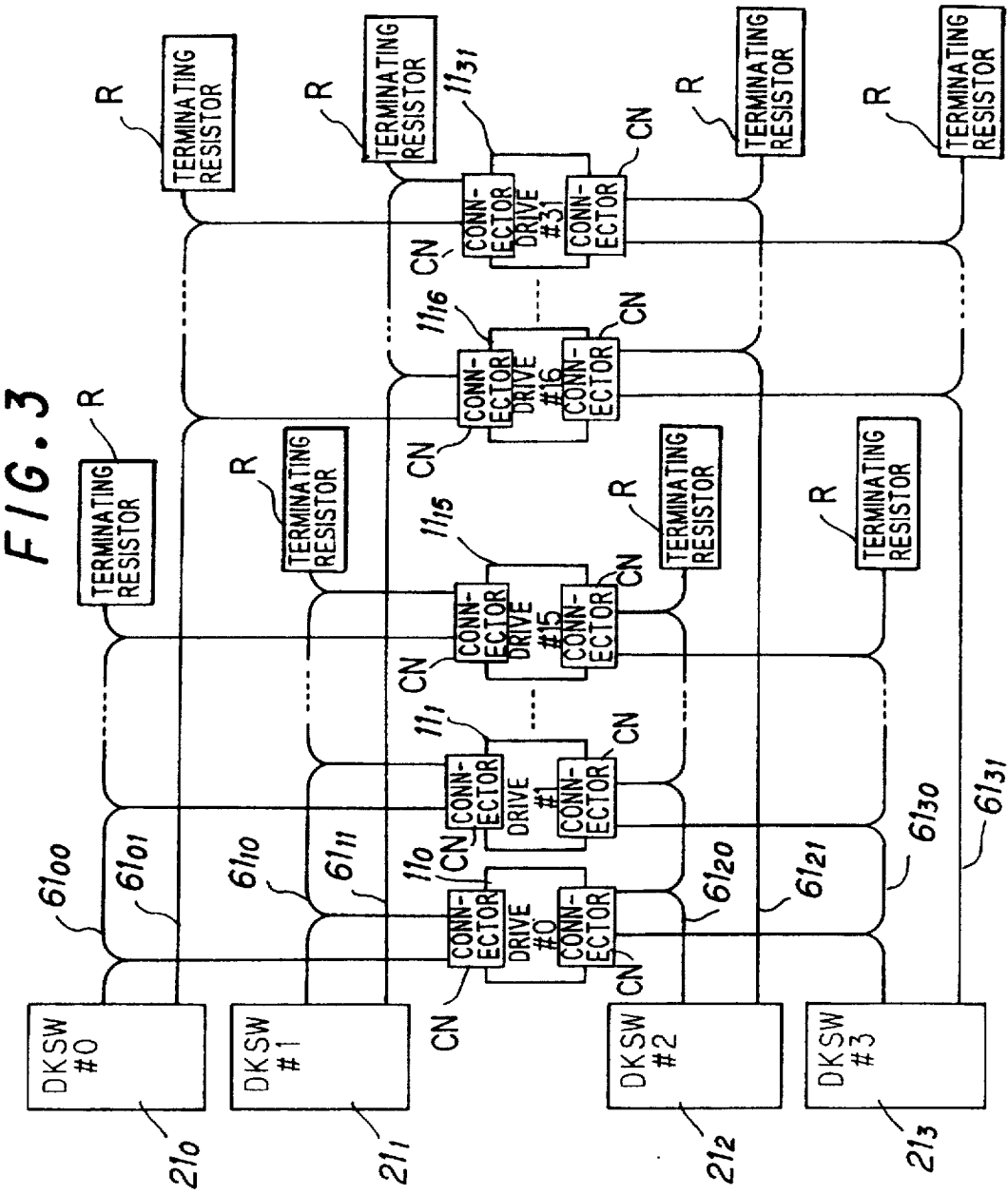
FIG. 3 is a diagram showing the connections of interface cables according to the present invention.

FIG. 3 is a detailed connection diagram showing the manner in which each of these units are interconnected by the interface cables. Each interface cable $61_{ij}$ (i=0~3, j=0~1) is a serial-transmission interface cable which transmits data in the form of a bit serial. Each interface cable has downward and upward control signal lines. The interface cables $61_{i0}$ (i=0~3) daisy-chain connect the intermediate control devices $21_i$ and the 16 disk drives $11_0 \sim 11_{15}$ in each of the downward and upward directions and transmit control information in the downward and upward directions in the form of a bit serial. Further, the interface cables $61_{i1}$ (i=0~3) daisy-chain connect the intermediate control devices $21_i$ and the 16 disk drives $11_{16} \sim 11_{31}$ in each of the downward and upward directions and transmit control information in the downward and upward directions in the form of a bit serial.

In addition to the connection provided by the interface cables $61_{ij}$ (i=0~3, j=0~1), each intermediate control device $21_0 \sim 21_3$ is connected to the disk drives $11_0 \sim 11_{31}$ also by one bidirectional serial interface cable for transmission of read/write data and a signal line for servo-clock transmission synchronized to rotation of the head disk assembly HDA. This cable and signal line are not illustrated.

Terminations are provided at terminating resistors R. Connectors CN are for the interface cables, with one connector CN being provided for two paths. Accordingly, each disk drive $11_0 \sim 11_{31}$ is provided with one connector CN per two interface cables. Thus, the arrangement is such that each of the disk drives $11_0 \sim 11_{31}$ is provided with two connectors CN so that control information is sent to and received from two intermediate control devices DKSW via two interface cables connected to one connector. This arrangement enhances reliability because even if one connector makes poor contact, each disk drive DK can still be accessed via the other connector.

(d) Daisy-chain connection

Figure 4:
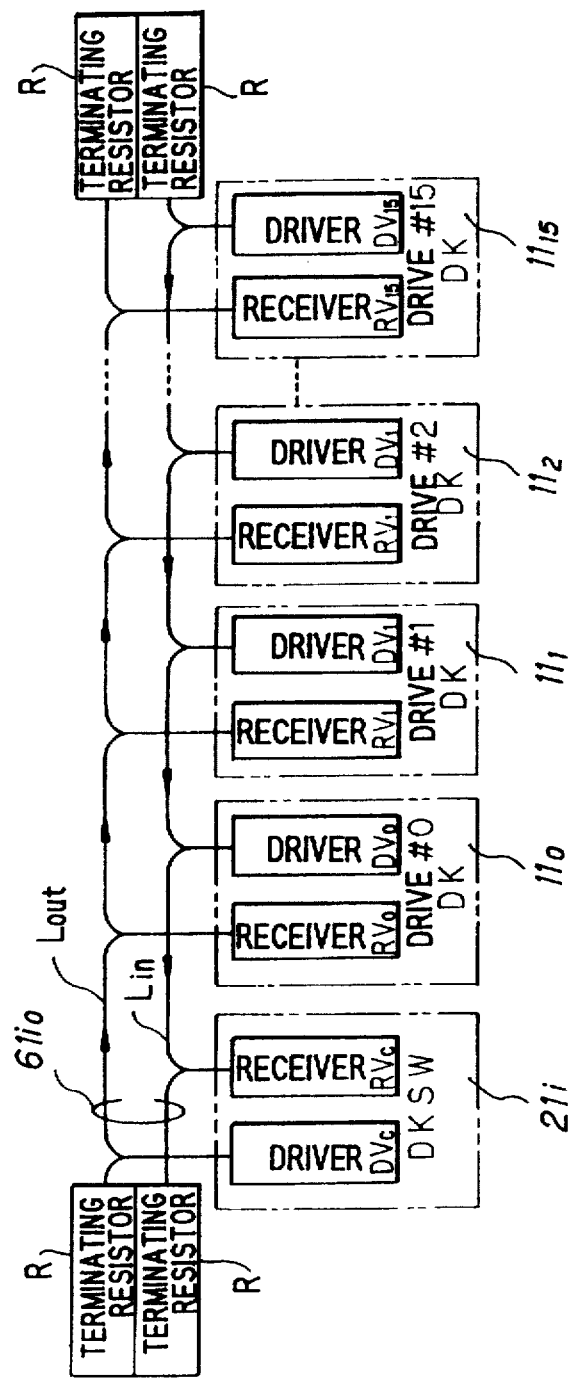
FIG. 4 is a diagram for describing a daisy-chain connection between an intermediate control device and disk drives.

FIG. 4 is a diagram for describing a case in which one intermediate control device DKSW is daisy-chain connected to 16 disk drives DK by interface cables. $L_{out}$ represents a downward control signal line (out-line) which transmits data from the intermediate control device (DKSW) $21_i$ to the 16 disk drives (DK) $11_0 \sim 11_{15}$ in the form of a bit serial, and $L_{in}$ represents a upward control signal line (in-line) which transmits data from each of the disk drives (DK) $11_0 \sim 11_{15}$ to the intermediate control device $21_i$ in the form of a bit serial. The intermediate control device $21_i$ is provided with a driver $DV_c$, and the disk drives $11_0 \sim 11_{15}$ are provided with drivers $DV_0 \sim DV_{15}$, respectively. These drivers function to send parallel data over the control signal lines in the form of a bit serial. The intermediate control device $21_i$ is provided with a receiver $RV_c$, and the disk drives $11_0 \sim 11_{15}$ are provided with receivers $RV_o \sim RV_1$, respectively. These receivers function to receive data transmitted as a bit serial and to convert this data to parallel data.

(e) Differential balanced-type transmission

Figure 5:
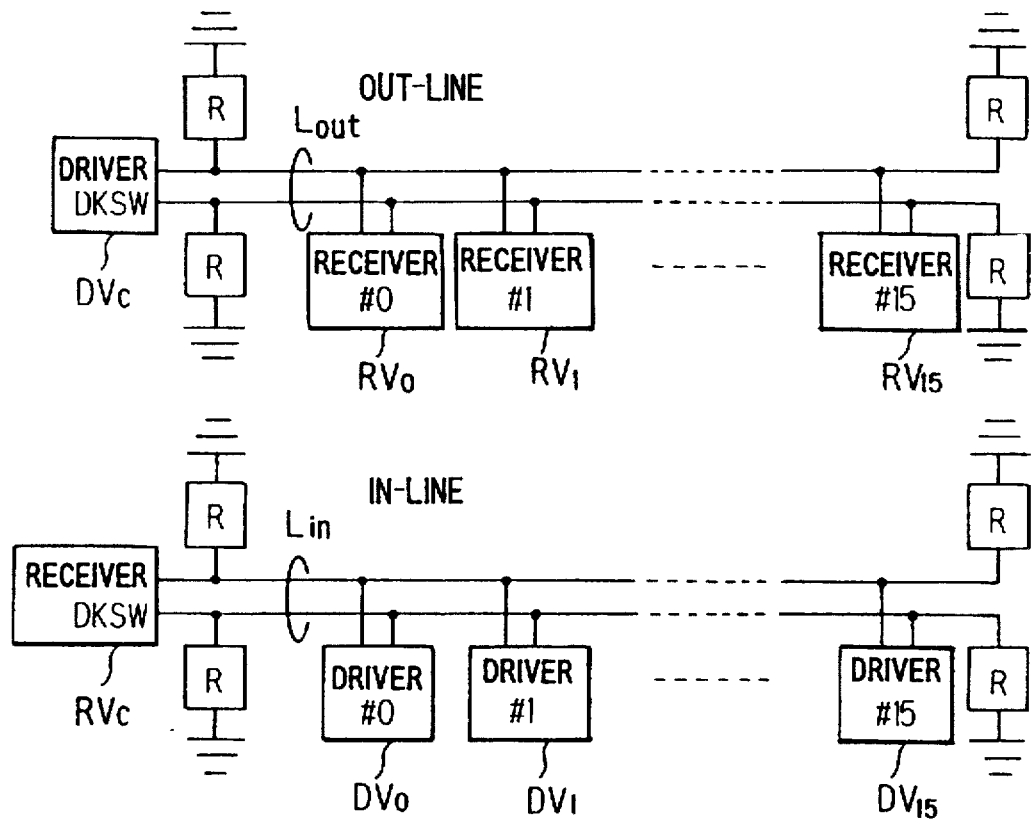
FIG. 5 is a diagram for describing another daisy-chain connection between an intermediate control device and disk drives.

FIG. 5 is a diagram for describing a case in which one intermediate control device DKSW is daisy-chain connected to 16 disk drives DR by interface cables in a different manner. Elements identical with those shown in FIG. 4 are designated by like reference characters. In this embodiment, the out-line $L_{out}$ and the in-line $L_{in}$ are each constituted by a pair of signal lines for transmitting data as a bit serial by differential balanced-type transmission. Terminating resistors R have a resistance value of, say, 65 ohms, decided by the characteristic impedance of the transmission line. Though both the transmitting and receiving ends are terminated in FIG. 5, it is permissible to terminate only one end (the receiving end, for example).

Figure 6:
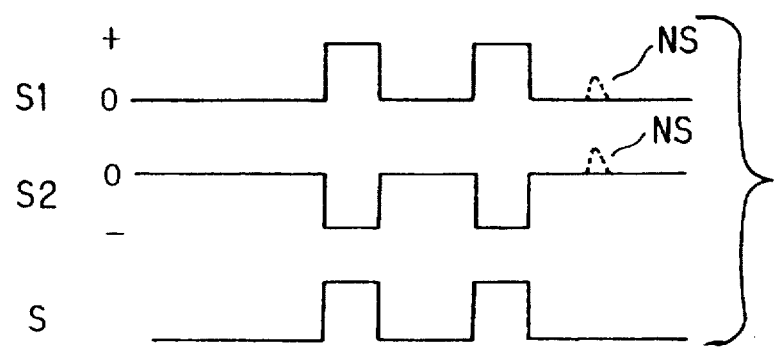
FIG. 6 is a diagram for describing differential balanced-type transmission.

According to differential balanced-type transmission, logical "1" is transmitted as a positive polarity on one signal line and as negative polarity on the other signal line, as shown in FIG. 6. Signals S1, S2 from the two signal lines are received by a receiver having a differential construction. The receiver outputs the difference S between the two signals. In accordance with differential balanced-type transmission, a noise-free signal S is obtained by taking the difference between the two signals S1, S2 because any noise NS produced will have the same polarity on each of the signal lines. In other words, a differential balanced-type transmission system is a high-speed transmission system that is strongly resistant to noise.

It is preferred that an arrangement based upon differential balanced-type transmission be adopted for the interface cables. However, the single-end type arrangement of FIG. 4 is acceptable if a high-speed transmission capability or noise-resistant capability is not required.

(f) Control information (f-1) Constitution of control information

The interface between the intermediate control device DKSW and each disk drive DK uses start-stop synchronization and, as mentioned above, the interface cable is composed of a pair of signal lines, namely the out-line $L_{out}$ which transmits control information from the intermediate control device DKSW to the disk drive DK, and the in-line $L_{in}$ which transmits control information from the disk drive DK to the intermediate control device DKSW.

Figure 7:
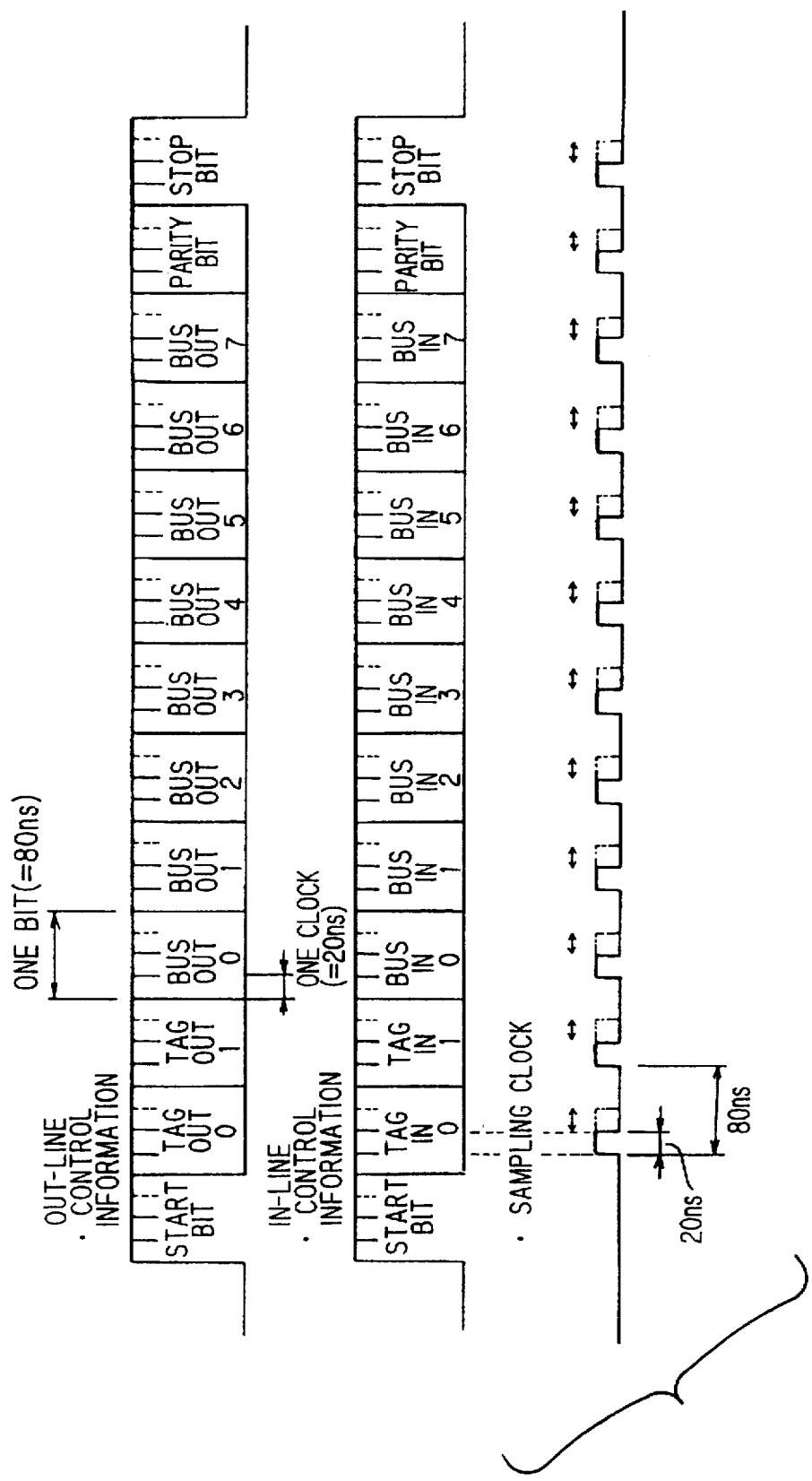
FIG. 7 is a diagram for describing the constitution of control information.

FIG. 7 is a diagram showing the constitution of control information transmitted over the out-line $L_{out}$ and in-line $L_{in}$. One bit is synchronized to a clock of, say, 20 ns, and has a width which is four times the clock, or 80 ns. More specifically, use is made of start-stop synchronization in which a transmitted bit string is received in synchronism with a sampling clock having a pulse width which is one-fourth of the bit width (80 ns), or 20 ns.

The control information on both the out- and in-lines is constituted by a total of 13 bits, namely one start bit for establishing synchronism, two bits for a tag, eight bits for a bus, one parity bit and one stop bit. The start bit is not always necessary but should be added on when reliability is to be enhanced. Thus, the control information is a total of 1.04 μs in length. The tag designates the category of control information by a combination of two bits. Parity is so designed that the number of all "1" bits, inclusive of the tag bits 0~1, the bus bits 0~7 and the parity bit, will be an odd number.

In general, an ordinary start-stop synchronization system is suited to a short data transmission and is employed in transmissions at low speed. In order to establish bit synchronization, the general practice is to create a sampling clock by counting 32 clock pulses at a clock which usually has a speed 64 times higher. The reason for this is that when clock precision or the precision of transmission speed is low, the error in the sampling clock with respect to a bit accumulates over time. Hence, precision should be made as high as possible.

By contrast, in order to exploit the capability of the start-stop synchronization system to transmit short data and to achieve high speed, the method of this embodiment eliminates cumulative error by using a quartz oscillator to raise the transmission speed on the transmitting side and improve the clock precision on the receiving side. Further, owing to the fact that the clock is a flip-flop and the leading edge of the start bit, which is the input data, are not in sync when the start bit is sensed, the so-called "settling" phenomenon occurs, in which flip-flop operation becomes unstable. According to the present invention, however, it is possible to achieve stability at the second clock of 20 ns by using a flip-flop capable of high-speed operation.

The foregoing makes it possible to establish a single-bit width which is four times the clock width and to create a sampling clock by a high-speed clock of 20 ns. As a result, 13-bit clock information can be transmitted at a high speed of 1.04 μs.

(f-2) Control information on out-line

FIG. 8 is a table for describing the definition of each bit constructing the control information transmitted from the intermediate control device DKSW to the out-line $L_{out}$. The control information transmitted to the disk drive DK is (1) a disconnect tag transmitted when a disk drive DK is disconnected; (2) a select tag transmitted when a prescribed disk is selected; (3) a command gate tag for transmitting various commands such as a read/write command and seek command to a disk drive; and (4) a sync-out tag for transmitting modifier data (a command parameter, such as a cylinder address at the time of a seek operation). The sync-out tag is such that the particular command for which modifier data is to be transmitted, as well as the number of times the transmission is to be made, is decided in advance. In the case of the seek command, for example, the disk drive DK is notified of the cylinder address by two sync-out tags.

There are two methods for selecting a disk drive DK by using the select tag. One method is for selecting a disk drive DK by setting "0000" to the four lower order bits of bus out and setting the drive address of the disk drive desired to be selected to the four higher order bits of bus out, and the other method is for selecting a disk drive by setting "1000" to the four lower order bits of bus out and setting the drive address of each disk drive DK to the four higher order bits of bus out in accordance with a prescribed sequence (polling).

(f-3) Control information on in-line

FIG. 9 is a table for describing the definition of each bit constructing the control information transmitted from the disk drive DK to the in-line $L_{in}$. The control information transmitted to the disk drive DK is (1) a select-in tag, which is a response to the select tag; (2) a sync-in tag, which is a response to the sync-out tag; (3) an end-operation tag for error notification; and (4) a valid tag, which is a response to the command gate tag.

There are two types of select-in tags. One is for setting a drive address to the four higher order bits of bus-in and responding when the select tag has been received, and the other is for setting the drive address and the present interrupt state to bus-in and responding when a select polling tag has been received.

The end-operation tag is sent from the disk drive DK to the intermediate control device DKSW at the following times in a case where an error is being held. That is to say, when the disk drive DK is holding an error, (a) at the time of response to the command gate tag, and (b) at the time of response to the sync-out tag, the end-operation tag is sent to the intermediate control device DKSW. The type of error can be determined by a sense command.

If an error is not being held, the disk drive DK sends a valid tag having the machine status to the intermediate control device DKSW in response to the command gate tag and sends a sync-in tag having the machine status to the intermediate control device DKSW in response to the sync-out tag.

(f-4) Machine status

FIG. 10 is a diagram for describing machine status. The bits designate (1) PAD IN PROGRESS (erasing in progress after write-in), (2) PARITY CHECK, (3) SEEK INCOMPLETE (seek unsuccessful), (4) SET-SECTOR NOT COMPLETE (set sector unsuccessful), (5) ON-LINE (connection to host enabled), (6) ATTENTION (interrupt holding state), (7) BUSY (operation in progress) and (8) SEEK/SET SECTOR INTERRUPT (interrupt by completion of seek/set sector operation). The bit for SET SECTOR NOT COMPLETE indicates that a set sector cannot be implemented owing to a faulty sector value or circuit malfunction. A faulty sector value relates to a case in which a sector value larger than the sector value (e.g., 243) per track has been designated by a set-sector command. A circuit malfunction relates to a case in which agreement with the designated sector value is not achieved even once in one revolution (one track) or a case in which agreement occurs twice or more in one revolution (one track).

(f-5) Read/write command

FIGS. 11A, 11B are diagrams for describing the definition of bits in the read/write command. In FIG. 11A, HA represents head advance for incrementing the head address by one. When head advance HA is designated, the disk drive DK increments the present head address, which has been stored in a head-address register, to read/write data with respect to the next track. This means that even if a read/write operation is performed over two or more tracks, the head can be changed over so that data can be read or written continuously.

QP represents a cue pad for executing padding until detection of an index following completion of a write command. In padding, the disk drive erases a record automatically up to the index.

RW (read/write) and ★W (write) issue the read/write command in the form of a combination of these two bits. In a case where RW and ★W are at the high level, as shown in FIG. 11B, the operation is the read operation. When RW is at the high level and ★W at the low level, the operation is the write operation. Thus, performing a writing operation mistakenly can be prevented by issuing a write command in the form of a combination of two bits. In this case, the effect of preventing erroneous writing due to malfunction can be enhanced by making the logic levels of the two bits of the command the reverse of each other in terms of logic. Furthermore, along with the bits indicating head advance HA, the cue pad QP and the read/write commands RW, ★W, bits ★HA, ★QP, ★RW, W, which are the reverse signals of these bits, are sent to the disk drive DK at the same time, as shown in FIG. 11A. Upon receiving the read/write command, the disk drive DK checks to determine whether the bits of each of the two sets are the reverse of each other. If the two bits are not the reverse of each other, then an error is judged to have occurred and this is transmitted to the intermediate control device DKSW as machine-status information. By adopting this arrangement, it is possible to prevent accidental incrementing of the head address, accidental padding and accidental writing.

(g) Mounting of disk drives in locker

As mentioned above, 16 disk drives (DK) $11_0 \sim 11_{15}$ are accommodated in one locker and the remaining 17 disk drives (DK) $11_{16} \sim 11_{31}$ are accommodated in another locker.

Figure 12B:
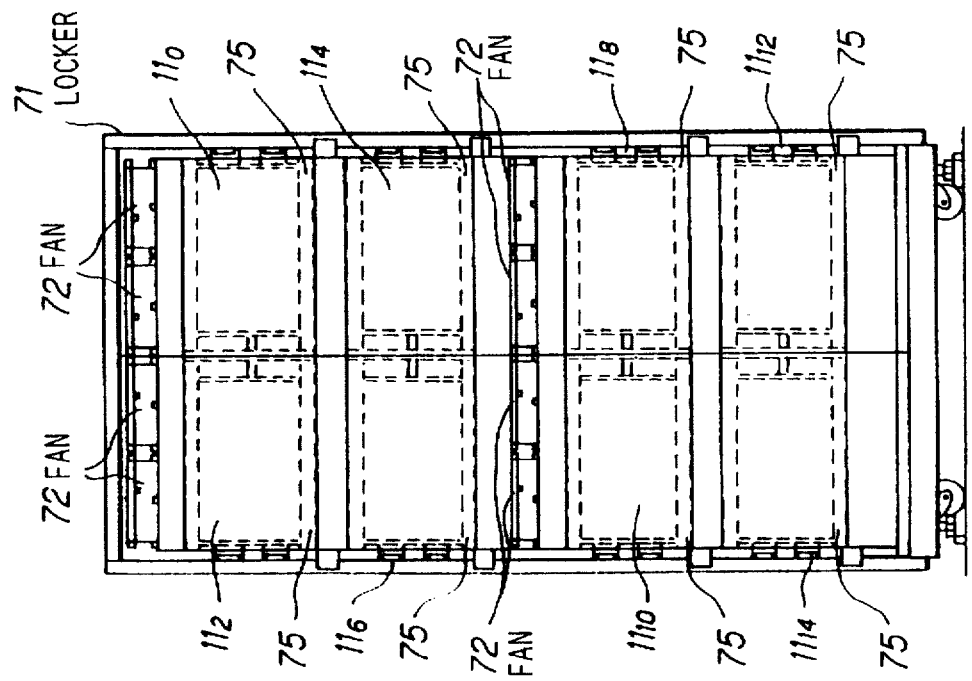
FIGS. 12A, 12B are diagrams showing the mounting of disk drives.
Figure 12A:
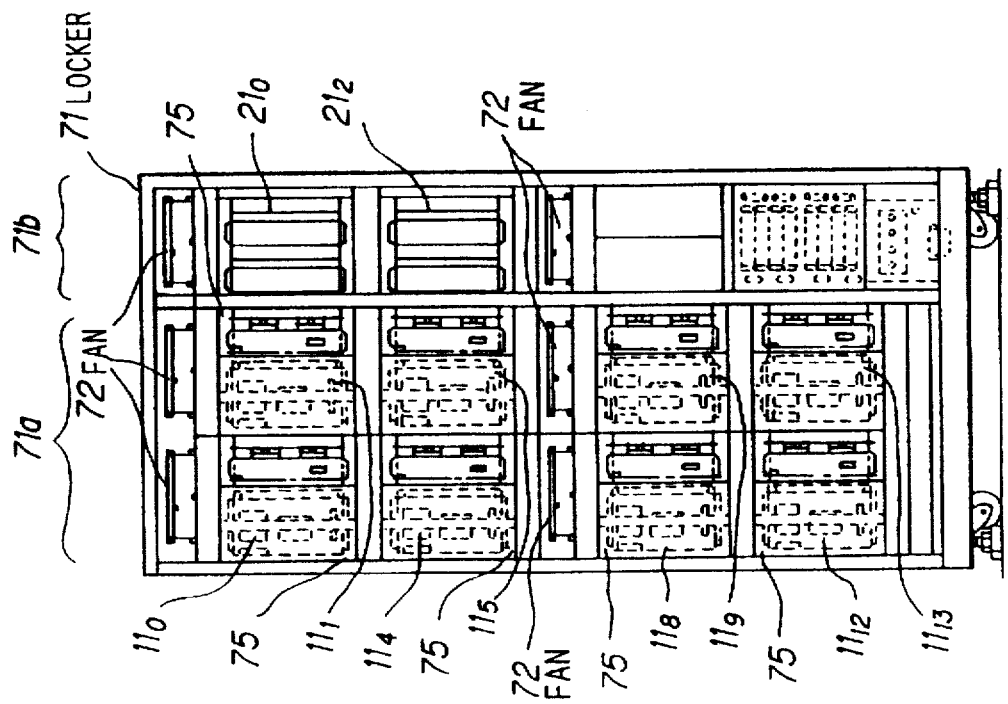

FIGS. 12A, 12B are mounting diagrams for a case in which 16 disk drives (disk modules) and four intermediate control devices DKSW have been mounted in one locker. FIG. 12A is a front view and FIG. 12B are left-side view. The locker, shown at number 71, is divided into a side 71a for the disk drives and a side 71b for the intermediate control devices. The side 71a for the disk drives is subdivided into four levels each of which is provided with an area for accommodating four disk drives. Thus disk drives $11_0 \sim 11_3$, $11_4 \sim 11_7$, $11_8 \sim 11_{11}$, $11_{12} \sim 11_{15}$ are accommodated on respective ones of four levels. Four cooling fans 72 are provided for every two levels. The side for the intermediate control devices also is divided into four levels. Two intermediate control devices $21_0 \sim 21_1$ are provided on the uppermost level and two control devices $21_2 \sim 21_3$ on the next level. Fans 72 are provided above the uppermost level.

Figure 13:
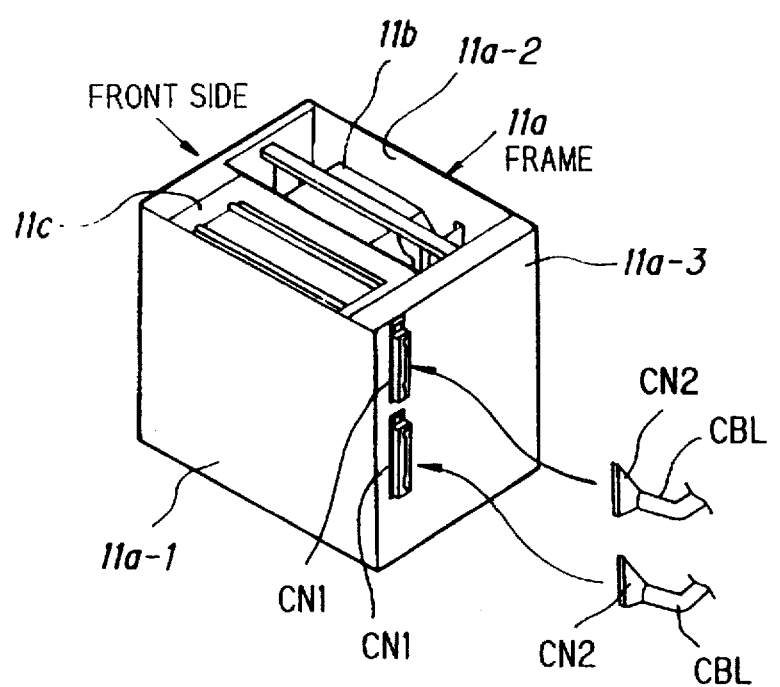
FIG. 13 is a perspective view of a disk module.

(h) FIG. 13 is a perspective view of a disk module in which a disk drive is accommodated within a frame to obtain a module. The disk module includes a frame 11a, a magnetic disk drive mechanism 11b for positioning the magnetic head relative to a rotating magnetic disk (not shown) by an accessing mechanism, and a circuit unit 11c for a power supply and for operating the magnetic disk drive mechanism. The front side of the frame 11a is open so that the magnetic disk drive mechanism 11b and power-supply/circuit unit 11c can be inserted into the frame 11a from the front side. The sides of the frame 11a are provided with side plates 11a-1 and 11-a2, and the back side is provided with a back plate 11a-3. The back plate 11a-3 is provided with two connectors CN1 into which connectors CN2 of two-path cables CBL, in each of which two interface cables are bundled, are inserted. The connectors CN of FIG. 3 are each constructed by the connector CN1 on the module side and the connector CN2 on the cable side. The disk module is mounted in a corresponding compartment 75 of the locker 71 (see FIGS. 12A and 12B) from the front or back of the locker along guide rails (not shown).

Figure 14:
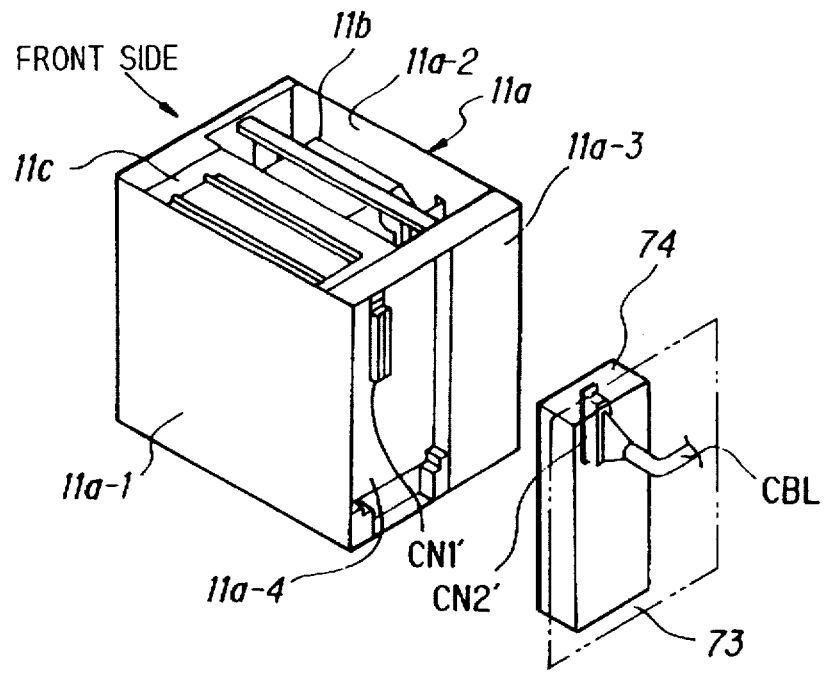
FIG. 14 is a perspective view of another disk module.

FIG. 14 is a perspective view of another disk module. The construction is the same as that shown in FIG. 13 with the exception of the back of the module, which is different. Specifically, the left half of the back plate 11a-3 has a recess forming a cavity 11a-4 on the bottom of which a single connector CN1' is provided. The cavity 11a-4 mates with a projection 74 provided on the back plate 73 of the locker compartment, and it is so arranged that the connector CN1' on the module side plugs into a cable-side connector CN2' provided on the projection 74, whereby the two connectors are connected. A four-path cable CBL' is attached to the connector CN2'. The four-path cable CBL' has a bundles of four interface cables $61_{00} \sim 61_{30}$ (see FIG. 3) or $61_{01} \sim 61_{31}$ connected to one disk drive. The disk drive is thus connected to the four intermediate control devices $21_0 \sim 21_3$.

Figure 15:
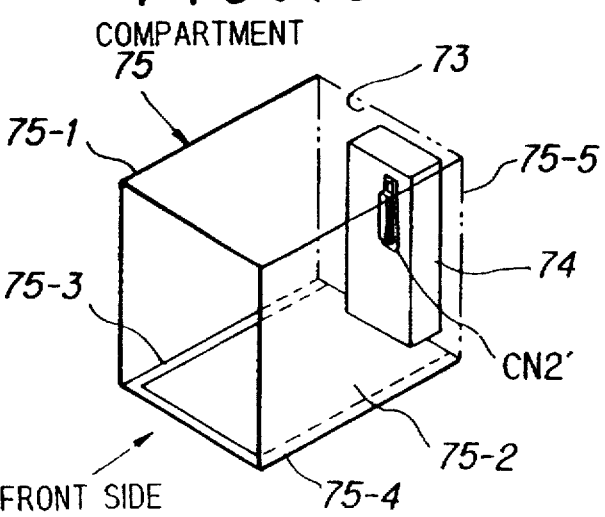
FIG. 15 is a diagram for describing an accommodating compartment of a locker.

FIG. 15 is a diagram for describing one compartment 75 of the locker. The compartment 75 is open at the front side, the sides of the compartment are provided with side plates 75-1, 75-2, the bottom is provided with guide portions 75-3, 75-4 on both sides, and the top side is open. The back side is provided with the back plate 73, the latter being provided with the projection 74 shaped to correspond to the cavity 11a-4 on the module side. The single connector CN2' on the cable side is screwed into the projection 74 to correspond to the connector CN1' on the module side. The four-bus cable CBL' is joined to the connector CN2'. Accordingly, when the disk module (FIG. 14) is inserted into the connector CN2', the projection 74 of the compartment 75 mates with the cavity 11a-4 of the module, then the connector CN1' of the module and the cable-side connector CN2' of the compartment 75 are connected together. Thus, the connectors CN1', CN2' can be connected together easily by a plug-in operation. If this plug-in structure is adopted, the connectors CN1', CN2' can be connected together reliably and can be prevented from being pulled apart.

(i) Intermediate control device and disk drive

Figure 16:
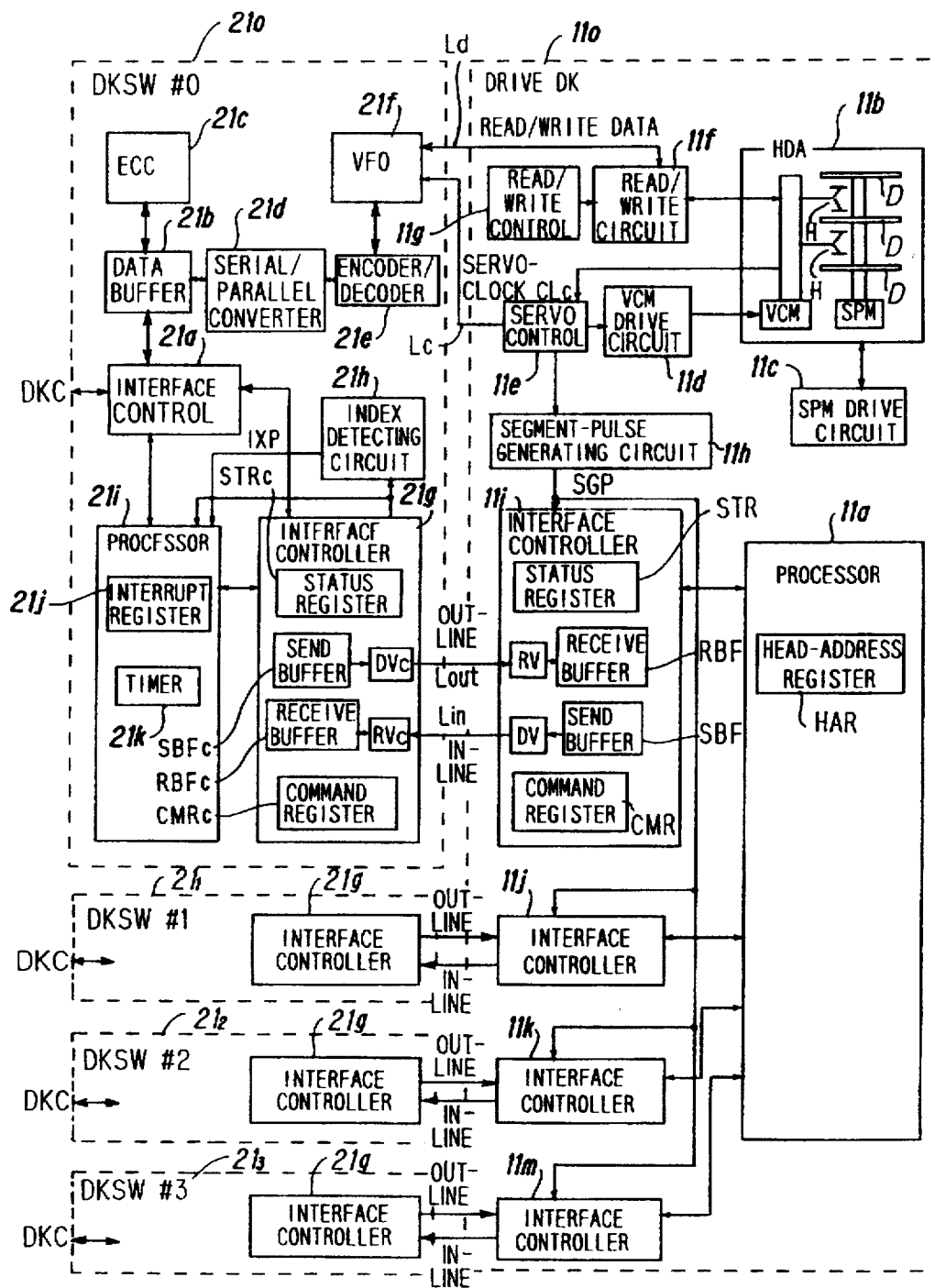
FIG. 16 is a block diagram showing the construction of an intermediate control device and a disk drive.

FIG. 16 is a block diagram showing the construction of an intermediate control device and a disk drive. The disk drive DK is shown at $11_0$, and identically constructed intermediate control devices DKSW are indicated at $21_0 \sim 21_3$. Though a case is illustrated in which only one disk drive DK is connected to each intermediate control device DKSW, all of the disk drives $11_0 \sim 11_3$, are connected to each intermediate control device DKSW.

(i-1) Intermediate control device

The intermediate control device DKSW includes an interface controller 21a for sending data to and receiving data from the disk controller DKC, a data buffer 21b for storing write data and read data, an error correction circuit (ECC) 21c for detecting and correcting data errors, and a serial/parallel converter 21d. The serial/parallel converter 21d converts parallel data, which has entered from the disk controller DKC, to serial data and converts serial data, which has been read from the disk drive DK, to parallel data.

The intermediate control device DKSW further includes an encoder/decoder 21e for converting the serial data, which has entered from the serial/parallel converter 21d, to, say, a 1/7 RLL code (1/7 run-length limited code), and for returning the serial data of the 1/7 RLL code, which has been read from the disk drive DK, to the original data. Also provided is a variable-frequency oscillator 21f which, at the time of a data-write operation, generates a write clock, which is synchronized to a servo clock CLc entering from the disk drive DK via a clock signal line Lc, and transmits the data to the disk drive DK via a data signal line Ld one bit at a time in sync with the write clock. As the time of a data-read operation, the variable-frequency oscillator 21f generates a read clock from a bit serial, which enters in the form of a bit serial from the disk drive DK, and sends the data to the encoder/decoder 21e one bit at a time in synchronism with the read clock generated.

The intermediate control device DKSW further includes an interface controller 21g for sending control information to and receiving it from all of the disk drives DK, an index detecting circuit 21h for sensing the index mark, which indicates the beginning of a track, from segment pulse (described later) that arrive from the disk drive DK via the in-line $L_{in}$, and a processor 21i for controlling all intermediate control devices. The processor 21i has an interrupt register 21j, which stores the interrupt state of each disk drive DK, and a timer 21k.

The interface controller 21g has a send buffer SBFc in which control information to be sent to the disk drive DK is set; a receive buffer RBFc for storing control information sent from the disk drive DK; a status register STRc for storing the status of the interface controller 21g; a command register CMRc in which a command for interface control is set by the processor 21i; a driver DVc for sending control information, which has been set in the send buffer SBFc, to the out-line $L_{out}$ in the form of a bit serial; a receiver RVc for converting control information, which has entered from the in-line $L_{in}$ in the form of a bit serial, to parallel data and storing the parallel data in the receive buffer RBFc; and a controller (not shown). The controller creates status information, controls the various components in accordance with the command for interface control, and controls the entry of segment pulse SGP (described later) into the index detecting circuit 21h. The processor 21i sets control information, which is to be sent to the disk drive DK, in the send buffer SBFc, or sets the interface control command in the command register CMRc and reads control information from the disk drive DK stored in the receive buffer RBFc, or reads the status data that has been stored in the status register STRc.

(i-2) Disk drive

The disk drive DK has a processor 11a for controlling the overall disk drive. The processor 11a has a head-address register HAR for storing the present head address. The disk drive DK further includes a head disk assembly (HDA) 11b having a number of magnetic disks D, magnetic heads H, a spindle motor SPM which co-rotates with all magnetic disks, and a voice coil motor VCM for positioning all heads at prescribed track positions in unison. The disk drive DK is further provided with a spindle-motor drive circuit 11c for rotating the spindle motor, a VCM drive circuit 11d for driving the voice coil motor VCM, and a servo-controller 11e for generating the servo clock CLc, which is synchronized to rotation of the disks, on the basis of the head reading signal, and for controlling head positioning under a command from the processor.

A read/write circuit 11f, which is connected to the magnetic heads, enters a write signal into the magnetic heads in accordance with data that has entered from the data signal line Ld at the time of a data-write operation, and sends read data to the data signal line Ld on the basis of a signal that has entered from the magnetic heads. A read/write controller 11g controls the reading and writing of data via the read/write circuit 11f in accordance with a command from the processor 11a. At the time of a data read/write operation, a segment-pulse generating circuit 11h generates a segment pulse SGP every 32 bytes and inserts an index mark indicating the beginning of a track. When data on a track has been divided into segments of a prescribed length (=32 bytes), the segment-pulse generating circuit 11h generates a segment pulse SGP every segment and inserts the index mark in the segment pulse.

Interface controllers 11i~11m send and receive control information to and from the intermediate control device DKSW.

(i-3) Interface controller

Figure 17:
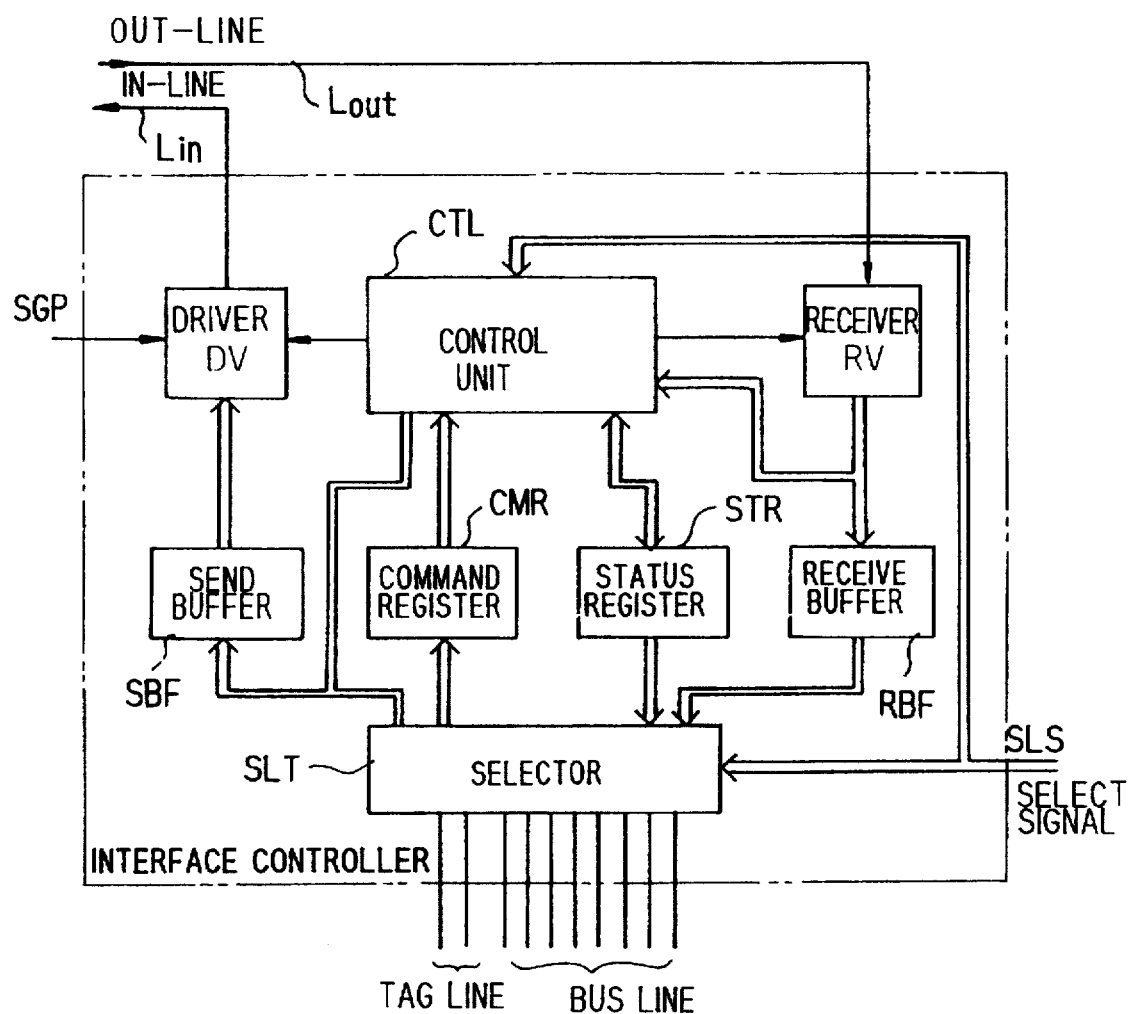
FIG. 17 is a block diagram showing an interface controller.

As shown in FIG. 17, each of the interface controllers 11i~11m has a send buffer SBF in which control information to be sent to the disk drive intermediate control device DKSW is set; a receive buffer RBF for storing control information sent from the intermediate control device DKSW; a status register STR for storing the status of the interface controller; a command register CMR in which a command for interface control is set from the processor 11a; a driver DV for sending control information, which has been set in the send buffer SBF, to the in-line $L_{in}$ the form of a bit serial; a receiver RV for converting control information, which has entered from the out-line $L_{out}$ in the form of a bit serial, to parallel data and storing the parallel data in the receive buffer RBF; a control unit CTL; and a selector SLT, etc.

The processor 11a (FIG. 16) selects each of the registers CMR, STR and buffers RBF, SBF by a select signal SLS and performs an input/output of data via the two-bit tag signal line and eight-bit bus signal line.

As shown in FIG. 18A, the receive register RBF is constructed to store control information (a two-bit tag and an eight-bit command code) from the intermediate control device DKSW. When the receive buffer RBF receives control information from the out-line $L_{out}$, a buffer-full bit of the status register STR turns on (see FIG. 18C). As shown in FIG. 18B, the send buffer SBF is constructed to store control information (a two-bit tag and an eight-bit machine status) sent to the intermediate control device DKSW. After the control information has been stored in the send buffer SBF, the send command is set in the command register CMR, whereupon the control information that has been stored in the send buffer SBF is transmitted to the in-line $L_{in}$ in the form of a bit serial. A buffer empty bit of the status register STR turns on in response to completion of the transmission.

(i-4) Status information

The status register STR is constructed to hold the status of the interface controller in the form of eight bits, as illustrated in FIG. 18C. (1) A BUSY bit indicates that operation is in progress. (2) A BUFFER FULL bit turns on when the receive buffer RBF receives control information from the intermediate control device DKSW and turns off when reading has been performed by the processor 11a. (3) A BUFFER EMPTY bit turns off when control information has been set in the send buffer SBF and turns on in response to completion of transmission of this control information. (4) A PARITY ERROR bit turns on in a case where a parity error is found in the received control information and is reset when the content of the status register STR has been read by the processor 11a. (5) A FRAMING ERROR bit turns on when a reception synchronization error such as a lacking start bit and stop bit is detected. (6) An OVERRUN bit turns on when, as the result of a malfunction, succeeding control information is sent in before the control information that has been stored in the receive buffer RBF is read out. (7) An UNDERRUN bit turns on when, as the result of a malfunction, succeeding control information is set in the send buffer SBF before the control information that has been stored in the send buffer SBF is read out.

(i-5) Interface control command

The interface control command set in the command register CMR is for the purpose of allowing the processor 11a to designate operation of the interface controller. As shown in FIG. 18D, this command is composed of a single start bit, a three-bit command and a four-bit drive address of the disk drive.

FIG. 18E is a command table. (1) $8X_H$ (where H indicates a hexadecimal number and x signifies the drive address) is an auto-polling command for instructing the interface controllers to send a select-in tag indicating there is no interrupt, to the intermediate control device DKSW automatically in response to a select tag based upon polling. (2) $CX_H$ (where x signifies the drive address) is an auto-polling command for instructing the interface controllers to send a select-in tag indicating there is an interrupt, to the intermediate control device DKSW automatically in response to a select tag based upon polling. (3) $AO_H$ is a send command which designates sending of control information that has been stored in the send buffer $S_{BF}$. (4) 90H is a receive command which designates that control information be received from the out-line $L_{out}$ and set in the receive buffer RBF.

(i-6) Operation of controller

By examining the data sent to it from the intermediate control device DKSW and by monitoring the status of each of the buffers RBF, SBF, the control unit CTL creates status information and stores the status information in the status register STR.

Further, upon receiving a start read/write command from the intermediate control device DKSW at the time of a read/write operation, the control unit CTL subsequently sends the segment pulse SGP generated by the segment-pulse generating circuit 11h (FIG. 16) to the in-line $L_{in}$ via the driver DV.

Furthermore, the control unit CTL executes control conforming to the interface control command that has entered from the processor 11a. The processor 11a reads the control information, which has been sent from the intermediate control device DKSW, from the receive buffer RBF and executes prescribed processing. Thereafter, the processor 11a creates control information for response, sets this information in the send buffer SBF and then sets the send command in the command register CMR. When the send command has been set in the command register CMR, the control unit CTL controls the driver DV so that the control information that has been stored in the send buffer SBF is sent to the in-line $L_{in}$ in the form of a bit serial.

Further, the processor 11a sets the 8x command in the command register CMR in an idle situation in which there is no interrupt, and sets the Cx command in the command register CMR in a case where an interrupt has occurred. Furthermore, if a polling tag (a select tag based upon polling) which agrees with the drive address is received from the intermediate control device DKSW, the control unit CTL automatically adds whether or not there is an interrupt onto the select-in tag, sets this tag in the send buffer SBF and transmits this select-in tag to the intermediate control device DKSW. As a result of adopting this arrangement, the control unit CTL is capable of responding automatically without the processor 11a verifying reception of the polling tag (the select tag based upon polling). This makes it possible to shorten response time. Further, the same effects can be obtained by adopting an arrangement in which the processor 11a sets an interrupt flag and a drive address in the send buffer SBF and sets an autopolling command in the command register CMR.

Upon receiving a select tag including its own drive address after the auto-polling command has been designated from the processor 11a, the control unit CTL turns on the buffer-full bit. Next, when the processor 11a sets the receive command in the command register CMR, the control unit CTL subsequently receives the control information from the intermediate control device DKSW and turns on the buffer-full bit whenever the above-mentioned control information is received. This state is maintained until the next time the auto-polling command is set.

(i-7) Segment pulse and index

The segment pulse generating circuit 11h generates a segment pulse every 32 bytes, as shown in FIG. 19, and inserts an index mark IDXM, which indicates the beginning of a track, in the train of segment pulse. When the control unit CTL of the interface controller 11i receives the start read/write command from the intermediate control device DKSW at the time of the read/write operation, as mentioned above, it subsequently sends the segment pulse SGP to the in-line $L_{in}$ via the driver DV until the read/write operation ends.

The segment pulse SGP enter the index detecting circuit 21h via the interface controller 21g of the intermediate control device (DKSW) $21_0$. The index detecting circuit 21h senses the index mark IDXM on the basis of a difference in pulse width between a segment pulse and the index mark, generates an index pulse IXP and applies the index pulse IXP to the processor 21i.

Figure 20:
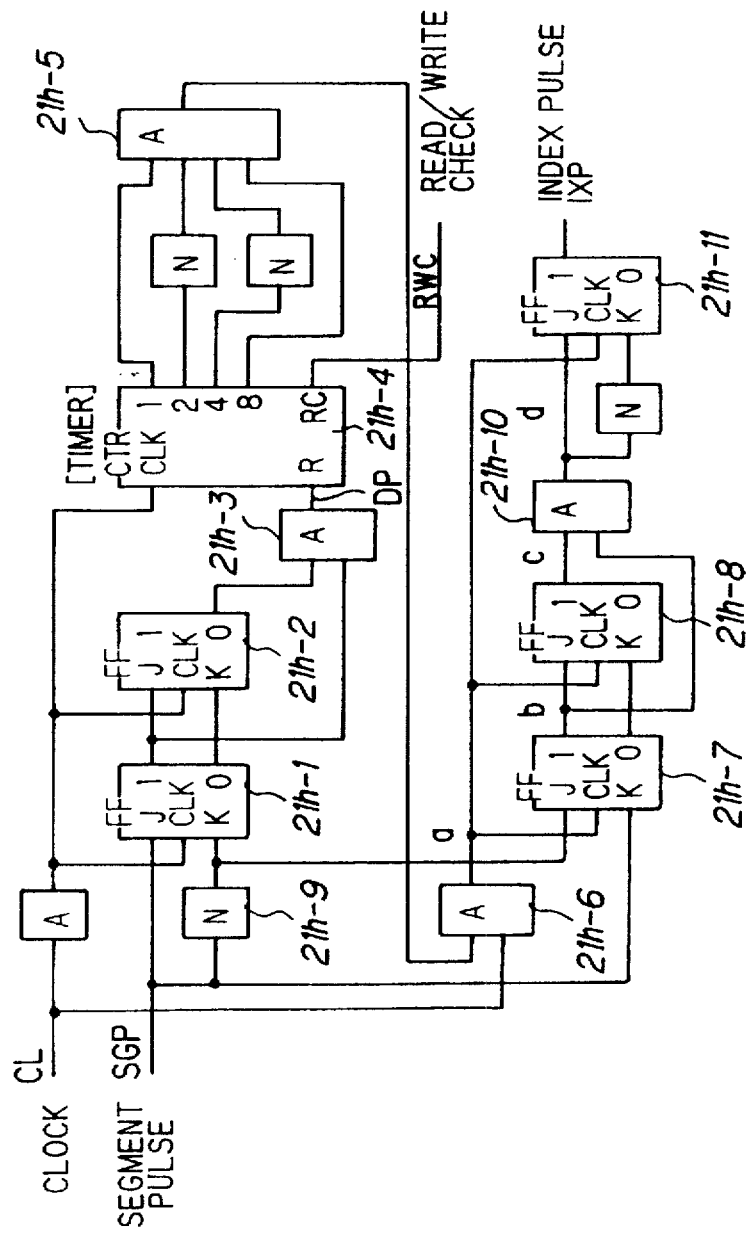
FIG. 20 is a diagram for describing the construction of the index detecting circuit.

FIG. 20 is a diagram for describing the construction of the index detecting circuit 21h. The circuit 21h includes AND gates A, NOT gates N, flip-flops FF and a timer CTR. Flip-flops 21h-1, 21h-2 and AND gate 21h-3 construct a differentiating circuit, which outputs a differentiated pulse DP, having a width of one clock, at the leading edge of the segment pulse SGP. Timer 21h-4 is reset by the differentiated pulse DP and then counts the clock pulses CL that follow. The output of the AND gate 21h-5 attains the high level when the count in the timer reaches a value of 9. Immediately after the count reaches the value of 9, the clock is passed through AND gate 21h-6 and emerges as a signal a. The signal a serves as the clock signal of flip-flops 21h-7, 21h-8 and 21h-11. In the index mark portion of narrow pulse width contained in the segment pulse SGP, the output of NOT gate 21h-9 is at the high level when a first clock pulse a1 (see FIG. 19) is generated and, hence, flip-flop 21h-7 is set (signal b="1"). The flip-flop 21h-8 is set (c="1") by a second clock pulse $a_2$ and therefore the output (signal d) of AND gate 21h-10 attains the high level. Flip-flop 21h-11 is set and flip-flop 21h-7 is reset by generation of a third clock pulse $a_3$, and flip-flop 21h-11 is reset by generation of a fourth clock pulse $a_4$. As a result, a high-level index pulse IXP is outputted from the moment the third clock pulse $a_3$ is generated to the moment the fourth pulse $a_4$ is generated. The index mark is thus detected.

The index mark is used in the reading of home address data (track address data) recorded at the beginning of a track.

Figure 21:
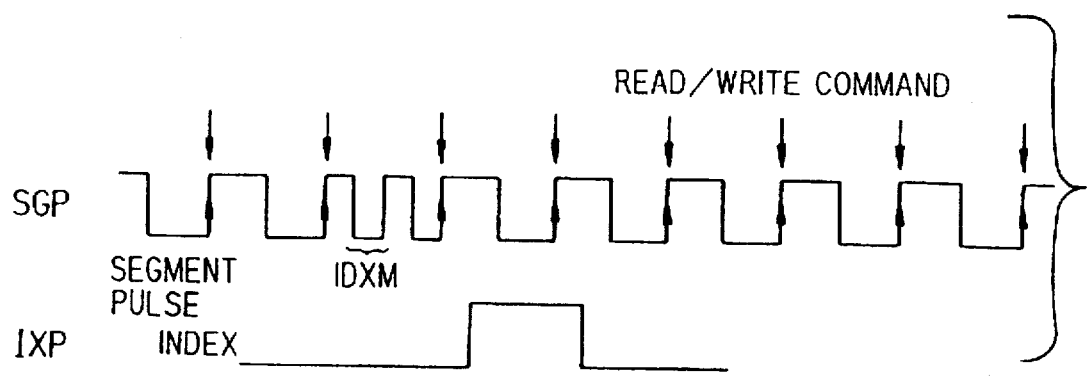
FIG. 21 is a diagram for describing segment pulse and an index mark.

FIG. 21 is a diagram for describing the relationship between the segment pulse SGP and index mark IXP. At the time of a read/write operation, the processor 21i of the intermediate control device DKSW sends the read/write command to the disk drive DK via the out-line $L_{out}$ at the leading edge of the segment pulse SGP. The processor 11a of the disk drive DK instructs the read/write control circuit 11g to execute read/write until the read/write command stops being received. As a result, the read/write control circuit 11g controls the read/write circuit 11f to perform the reading and writing of data.

Figure 22:
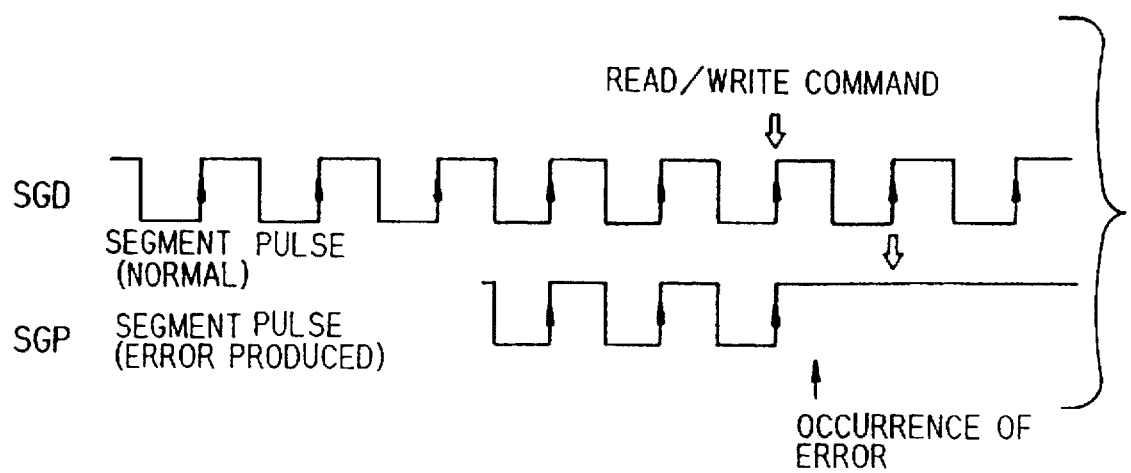
FIG. 22 is a diagram for describing a read/write check.

In a case where an error has occurred in response to the read/write command, the control unit CTL of the interface controller 11i in the disk drive DK holds the segment pulse SGP at the high level (="1"), as shown in FIG. 22, to notify the intermediate control device DKSW of the occurrence of the error. When the segment pulse are held at the high level, the timer 21h-4 (FIG. 20) of the index detecting circuit 21h in the intermediate control device DKSW is no longer reset. Therefore, when the value of the count increases and exceeds a prescribed count, a high-level read/write check signal RWC emerges from an RC terminal to notify the processor 21i that an error has occurred.

(j) Overall operation (j-1) Overview

A prescribed host device HOST (see FIG. 2) issues a read command for a specific disk drive, a specific track and a specific record to the disk controller DKC via a channel CH.

The disk controller DKC selects the disk drive via the intermediate control device DKSW and issues a seek command for positioning the head at the specific track. The disk controller DKC waits for completion of the seek operation, searches for the specific record by a set-sector command and then transmits a read command after completion of the search.

As a result, the disk drive reads the designated record and sends it to the disk controller DKC via the intermediate control device DKSW. When the reading of transmission of data ends, the intermediate control device DKSW commands the disk drive to finish the read command, thereby terminating the overall read operation.

(j-2) Disk-drive selection sequence

The intermediate control device DKSW responds to the select command from the disk controller DKC by attaching a drive address to the select tag (see FIG. 8) and then transmitting the select tag to the disk drive via the out-line $L_{out}$. Upon receiving the select tag, the disk drive DK verifies the drive address and, if it is its own drive address, sends the select-in tag (see FIG. 9) to the intermediate control device DKSW from the in-line $L_{in}$. The disk drive DK that has transmitted the select-in tag maintains the select state and then, accepts the command-gate tag, etc., sent subsequently via the out-line $L_{out}$.

(j-3) Command sequence

The intermediate control device DKSW attaches a command code to the command gate tag and then transmits the tag to the selected disk drive DK via the out-line $L_{out}$. Upon receiving the command gate tag, the disk drive DK attaches the machine status to the valid tag and then sends the valid tag from the in-line $L_{in}$ to start a prescribed operation. In a case where the command accompanies modifier, the intermediate control device DKSW transmits modifier data a requisite number of times by the sync-out tag while verifying sync-in tag sent from the disk drive. The disk drive DK attaches the machine status to the sync-in tag and answers the requisite number of times. When transmission of the modifier data ends, the disk drive DK performs a prescribed operation, such as the seek operation, on the basis of the modifier data received.

When an operation that takes time, as in the case of the seek command, a disconnect command is issued by the disk controller DKC. As a result, the intermediate control device DKSW disconnects the disk drive DK by a disconnect sequence based upon the disconnect tag and temporarily cancels the selection. The intermediate control device DKSW recognizes, by a polling sequence (described later) the termination of the command by the disk drive DK.

(j-4) Read/write sequence

The intermediate control device DKSW attaches the start read/write command to the command gate tag and then transmits the tag to the selected disk drive DK via the out-line $L_{out}$. Upon receiving the command gate tag, the disk drive DK answers with the valid tag via the in-line $L_{in}$ and waits for the read/write command.

After the valid tag is received, the intermediate control device DKSW transmits the head number of the modifier in the form of the sync-out tag. The intermediate control device DKSW waits for reception of the sync-in tag, attaches the read/write command to the command gate tag after reception of the sync-in tag and then transmits the tag to the out-line $L_{out}$ again. Upon receiving the command gate tag, the disk drive DK sends the segment pulse SGP to the in-line $L_{in}$.

Thus, by sending and receiving the read/write command after the sending and receiving of the start read/write command, it is possible to prevent erroneous writing of data as caused by interface failure.

The intermediate control device DKSW repeats the transmission of the command gate tag and read/write command on the out-line $L_{out}$ segment by segment until the read/write operation ends.

The intermediate control device DKSW halts the transmission of the command gate tag and read/write command in response to indication of the end of the read/write operation from the disk controller DKC (i.e., in response to transfer of data seven times following acknowledgment of sync-out stop).

The disk drive DK judges continuation of read/write segment by segment, halts the read/write operation in response to discontinuation of the read/write command of the command gate tag and stops the transmission of the segment pulse SGP.

By thus judging continuance of read/write every segment, it is possible to prevent the write state from remaining in effect at the time of some malfunction, thereby making it possible to prevent erasure of necessary data.

Figure 23:
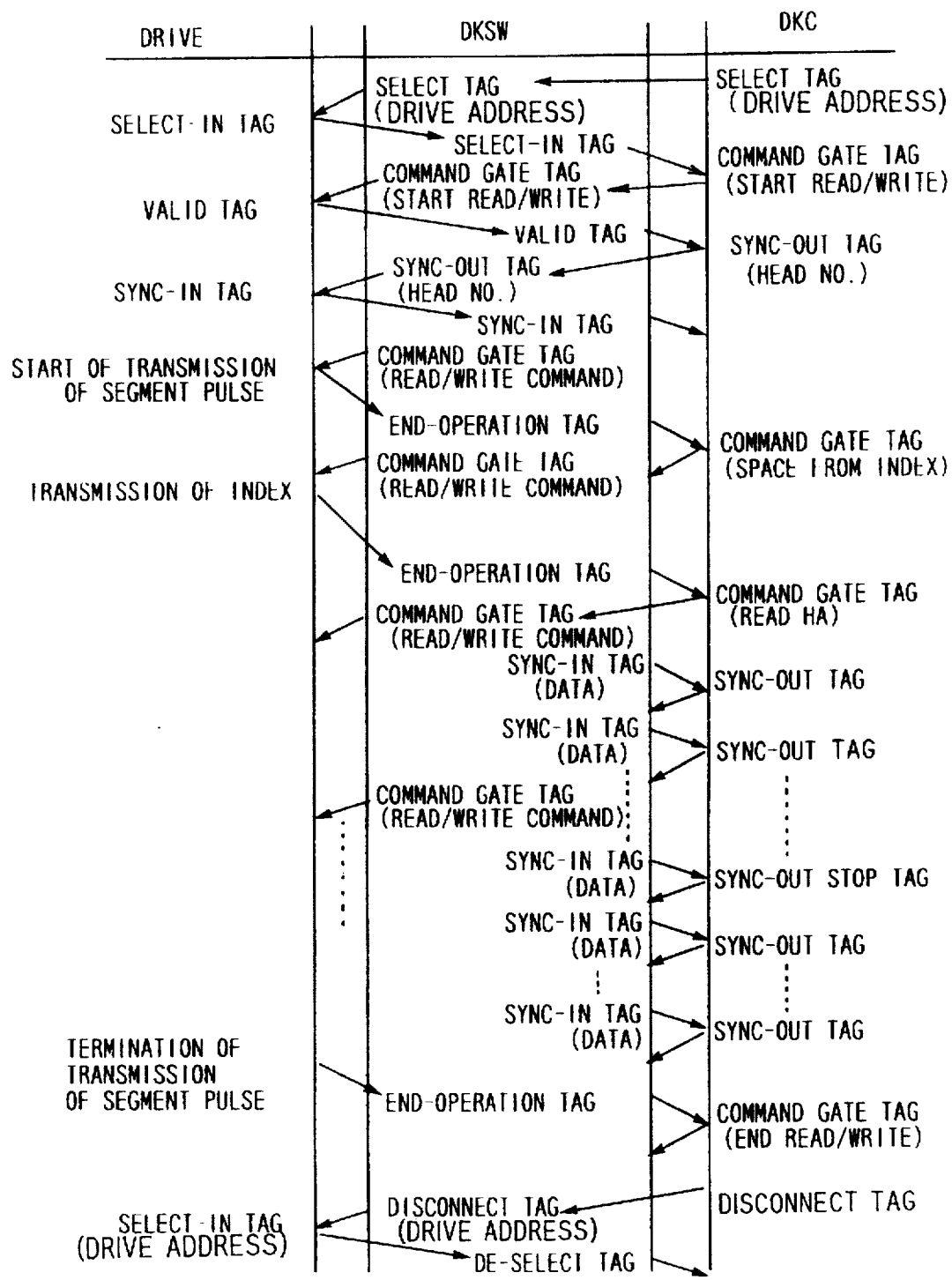
FIG. 23 is a diagram for describing a read sequence procedure.

FIG. 23 is a diagram for describing the procedure of the read sequence through which home address information (HA) and the ensuing record are read from the start of a track.

When a disk drive is designated by a start I/O from the host, the disk controller DKC enters the select command (select tag), which contains the drive address, into the intermediate control device DKSW. The intermediate control device DKSW attaches the drive address in response to the select command and then sends the select tag (see FIG. 8) to the out-line $L_{out}$. Upon receiving the select tag, the disk drive DK verifies the drive address and, if the drive address is its own, sends the select-in tag (see FIG. 9) to the intermediate control device DKSW from the in-line $L_{in}$. After sending the select-in tag, the disk drive DK maintains the select state and accepts the command gate tag, etc., sent subsequently via the out-line $L_{out}$. The foregoing is the disk-drive selection sequence.

Upon receiving the select-in tag, the intermediate control device DKSW so informs the disk controller DKC. As a result, the disk controller DKC enters the start read/write command (the command gate tag) into the intermediate control device DKSW. Upon receiving the start read/write command, the intermediate control device DKSW attaches the start read/write command to the command gate tag and then sends the tag to the out-line $L_{out}$. Upon receiving the command gate tag, the disk drive DK attaches the machine status to the valid tag and then transmits the tag from the in-line $L_{in}$. When the intermediate control device DKSW notifies the disk controller DKC of reception of the valid tag, the disk controller DKC enters the head number (head address) into the intermediate control device as a modifier.

Since the start read/write command is a command accompanied by a modifier, the modifier data (head address) is subsequently transmitted by the sync-out tag while the answer of the sync-in tag is verified. The disk drive DK attaches the machine status to the sync-in tag and then responds. If the transmission and reception of the modifier data are finished, the disk drive carries out a head changeover operation on the basis of the head address received.

With regard to a command not accompanied by modifier data, the disk drive DK sends the select-in tag to the in-line upon receiving such a command and then immediately executes the processing of the command. The foregoing is the command sequence.

When the head changeover operation is completed, the intermediate control device DKSW attaches the read/write command to the command gate tag and then sends the tag to the disk drive DK. Upon receiving the read/write command, the disk drive DK sends the segment pulse SGP to the intermediate control device DKSW via the in-line $L_{in}$.

Upon receiving the segment pulse, the intermediate control device DKSW sends the end-operation tag to the disk controller DKC. Upon receiving the end-operation tag, the disk controller DKC enters a command gate tag with a "space from index" attached thereto into the intermediate control device DKSW. Whenever a segment pulse is received, the intermediate control device DKSW sends the command gate tag, to which the read/write command has been attached, to the disk drive DK via the out-line $L_{out}$.

Upon sensing the index mark indicating the beginning of a track, the disk drive DK inserts this index mark into the segment pulse SGP and sends the resulting signal to the intermediate control device DKSW via the in-line $L_{in}$.

If a prescribed number of segments is received after the index is sensed, the intermediate control device DKSW sends the end-operation tag to the disk controller DKC. Upon receiving the end-operation tag, the disk controller DKC instructs the intermediate control device DKSW of the read HA (home address). On the basis of the read HA, the intermediate control device DKSW attaches the read/write command to the command gate tag and then sends the tag to the disk drive DK via the out-line $L_{out}$. Upon receiving the read/write command, the disk drive DK sends the home address data read from the magnetic head to the intermediate control device DKSW via the data line Ld.

The intermediate control device DKSW sends this home address data to the disk controller DKC by the sync-in tag and, whenever a segment pulse SGP is received, sends the read/write command to the disk drive DK.

When the sync-out tag and sync-in tag (data) are sent and received between the disk controller DKC and the intermediate control device DKSW and the reading of the home address HA and record which follow the index is finished, the disk controller DKC sends the sync-out stop tag before the transfer of data seven times. When this sync-out stop tag is received, the intermediate control device DKSW terminates transmission of the read/write command. In response to the halt to reception of the read/write command, the disk drive DK halts the transmission of the segment pulse SGP. When the segment pulse SGP stop being received, the intermediate control device DKSW sends the end-operation tag to the disk controller DKC. As a result, the disk controller DKC sends the end read/write command to the intermediate control device DKSW and then sends the disconnect tag to the intermediate control device DKSW.

The intermediate control device DKSW attaches the drive address to the disconnect tag and then sends this tag to the out-line $L_{out}$. The disk drive DK responds to the disconnect tag by sending the select-in tag to the intermediate control device DKSW and the intermediate control device DKSW sends a de-select tag to the disk controller DKC to end one read sequence.

The foregoing is a case in which data is read from the beginning of a track. In a case where a record at the intermediate portion of a track is read, seek and set sectors are implemented in the command sequence, the read/write command is sent to the disk drive DK at the conclusion of these operations and reading of data is subsequently performed in a manner the same as that described above.

(j-5) Read/write check sequence

If an error occurs in response to a read/write command in the read/write sequence, the disk drive DK holds the segment pulse SGP, which are sent to the inline $L_{in}$, at the high-level, as shown in FIG. 22, thereby notifying the intermediate control device DKSW of the fact that an error has occurred.

Figure 24:
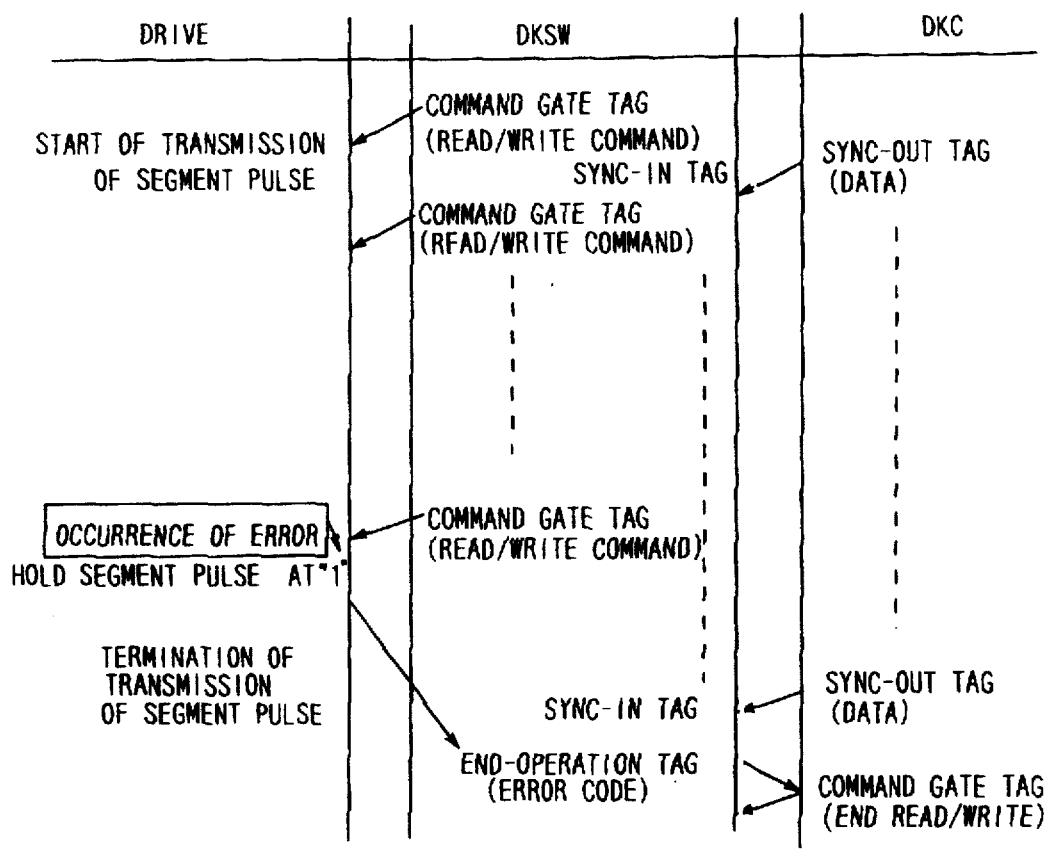
FIG. 24 is a diagram for describing a read/write check sequence procedure.

FIG. 24 is a diagram for describing the procedure of a read/write check sequence. When an error occurs in response to the read/write command in the above-described read/write sequence, the disk drive DK raises the segment pulse SGP to the high level for at least a prescribed period of time. When the intermediate control device DKSW senses that the segment pulse SGP have remained at the high level in excess of the prescribed time, it adds an error code onto the end-operation tag and then sends the tag to the disk controller DKC. As a result, the disk controller DKC sends end read/write to the intermediate control device DKSW and terminates read/write.

(j-6) Head switch sequence

In a case where head advance has been designated by the read/write command (FIGS. 11A, 11B) in the read/write sequence, the disk drive DK increments the head address, which has been stored in the head-address register, by +1 and changes over the read/write head.

(j-7) Polling sequence

Figure 25:
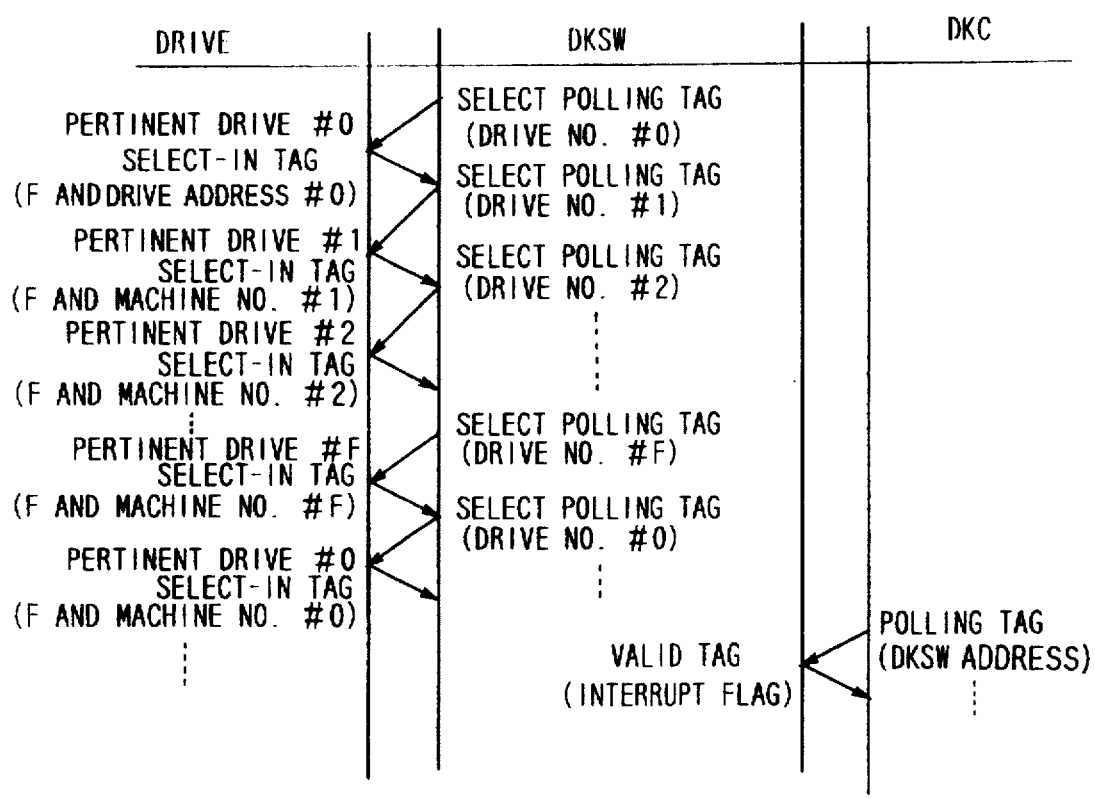
FIG. 25 is an diagram for describing a polling sequence.
Figure 26:
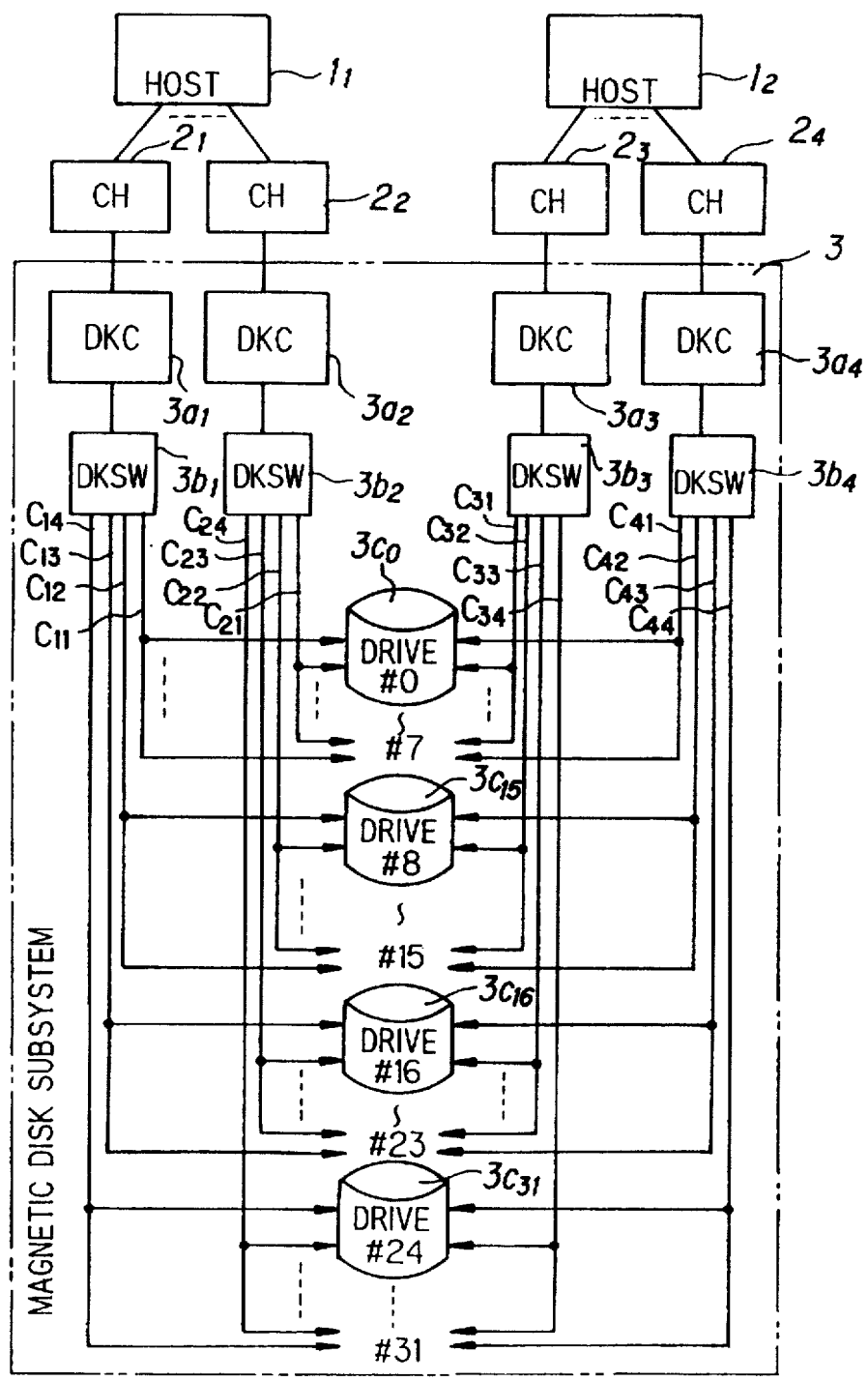
FIG. 26 is a diagram for describing the configuration of a magnetic disk subsystem according to the prior art.
Figure 27:
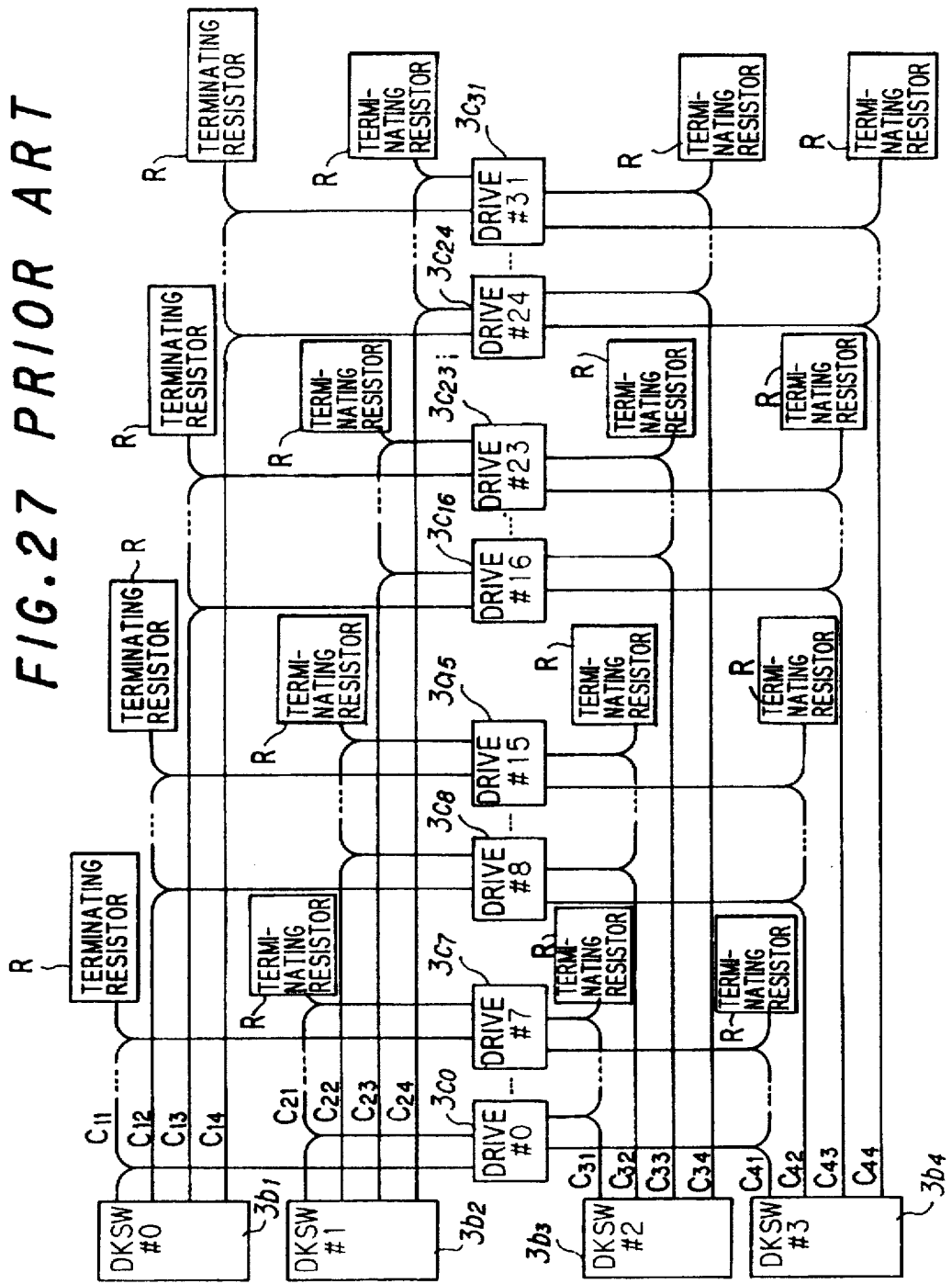
FIG. 27 is a diagram showing the connections of interface cables according to the prior art.

FIG. 25 is a diagram for describing the procedure of a polling sequence.

The intermediate control device DKSW scans the 16 disk drives DK successively by the select tag (polling) when the device is idle and searches for an interrupt. Upon receiving the select tag (polling), the disk drive DK verifies the drive address and, if the drive address is its own, responds by setting an interrupt flag in the select-in tag. The disk drive DK that has responded immediately enters an idle state. Furthermore, at the end of an operation with respect to a command (seek, set sector, etc.), or when the ready state is in effect after the introduction of power, the disk drive DK makes the interrupt flag "1".

Owing to operation of the timer $21k$, the intermediate control device DKSW waits 1 μs, for example, for the response of select-in. The disk drive DK, on the other hand, makes the select-in response within, say, 500 ns of receipt of the select tag (polling). The intermediate control device DKSW stores whether or not an interrupt is present in the interrupt register $21j$ and immediately answers with the content of the interrupt register in accordance with polling from the disk controller DKC.

The disk drive DK is equipped with interface controllers $11i~11m$ in correspondence with the respective intermediate control devices DKSW. Therefore, even in case of polling from four intermediate control devices DKSW simultaneously, the disk drive DK is capable of answering all of the select-in tags correctly within 500 ns.

In a case where the operation designated for the disk drive DK takes time, the intermediate control device DKSW disconnects the disk drive DK and raises the order of priority of polling with respect to disk drive DK disconnected. If this arrangement is adopted, the completion of the operation performed by the disconnected disk drive DK can be recognized promptly.

The foregoing description relates to a magnetic disk apparatus and magnetic disk subsystem. However, the present invention is not limited to this device and subsystem but is applicable to other disk apparatus and other disk subsystems as well.

In accordance with the present invention as described above, each of the intermediate control devices is daisy-chain connected to the n-number disk drives by control-information signal lines in each of the downward and upward directions, and control information is sent and received between the intermediate control devices and each of the disk drives in the form of a bit serial via the downward and upward control-information signal lines in accordance with the serial interface. Accordingly, the interface cable connected to one disk drive can consist of two control signals lines, one is for downward direction and the other is for upward direction, thereby making it possible to reduce greatly the number of signal lines and to reduce the size of the magnetic disk apparatus.

Further, the number of drivers in each disk drive need be only one per interface cable, and the number of receivers need be only one per interface cable. As a result, the numbers of drivers and receivers can be reduced greatly, power consumption can be curtailed and costs can be kept low. Furthermore, since the number of signal lines in the interface cables is small, connectors can be made compact. This makes it possible to reduce the size of the magnetic disk apparatus even further.

Furthermore, in accordance with the present invention, interface cables of m (=4) paths connected to each disk drive are divided into s (=2) sets, one connector is provided for each set and m/s (=2) intermediate control devices are connected to one disk drive via each connector. This arrangement enhances reliability because even if one connector makes poor contact, the disk drive can still be accessed via the other normal connector. Further, one connector is provided for all of the interface cables connected to each disk drive, and the disk drive is so arranged that the connector on the disk-drive side is connected by being plugged into the connector on the signal-line side. As a result, the connector can be prevented from being pulled out and it is possible to obtain a high reliability even through use of a single connector.

Furthermore, in accordance with the present invention, the control-information signal lines which daisy-chain connect the intermediate control devices and the disk drives are constituted by differential balanced-type transmission lines. This makes it possible to reduce the occurrence of error due to noise, thereby enhancing the reliability of the system. Moreover, in accordance with the present invention, the control information sent and received between the intermediate control device and disk drive is composed of a string of data bits and a start bit placed at the beginning of the string. The bit string is received on the receiving side in synchronized fashion by start-stop synchronization. One bit can be formed to have a width which is four times the clock width (32 times in ordinary start-stop synchronization). This makes it possible to reduce bit width and raise transmission speed.

Furthermore, in accordance with the present invention, in a case where the intermediate control device reads and writes data, it transmits a start read/write command to the prescribed disk drive via the downward control signal line. Upon receiving the start read/write command, the disk drive sends a valid tag to the intermediate control device via the upward control signal line if an error has not occurred. Upon receiving the valid tag, the intermediate control device sends a read/write command to the disk drive via the downward control signal line to read data from or write data to the disk. By thus sending and receiving the read/write command after the sending and receiving of the start read/write command, it is possible to prevent the erroneous writing of data that can be caused by interface malfunction or the like.

Further, in accordance with the present invention, the disk drive transmits segment pulse to the intermediate control device in response to reception of the read/write command. Whenever it receives a segment pulse, the intermediate control device sends the read/write command to the disk drive until the reading/writing of data ends. The disk drive halts the transmission of segment pulse in response to termination of the read/write command. By thus making a judgment concerning continuance of the read/write operation whenever a segment pulse is received, it is possible to prevent a situation in which necessary data is erased owing to abnormal continuation of the write state at the time of some malfunction.

The present invention is such that if an error occurs in response to issuance of the read/write command, the disk drive suspends transmission of the segment pulse and holds the upward control signal line at the high logic level to notify the intermediate control device of the fact that an error has occurred in response to the read/write command. By adopting this arrangement, the intermediate control device is capable of immediately recognizing the occurrence of the error in response to the read/write command and of halting the read/write operation.

In accordance with the present invention, the disk drive attaches an index mark, which indicates the beginning of a track, to the segment pulse before sending these pulses to the intermediate control device. The latter identifies the beginning of a track by sensing the index mark from among the segment pulse. If this arrangement is adopted, the home address information of the beginning of the track ca be read in reliably. In a case where the reading/writing of data is performed over a plurality of tracks, incrementing of the head address can be designated by sensing the index mark, thereby making it possible to perform the reading/writing of data upon changing over the head.

Furthermore, in accordance with the present invention, the intermediate control device issues the read/write command to the disk drive in the form of a two-bit combination. Writing of data mistakenly can be prevented by thus commanding the write operation by a combination of two bits. In this case, the effect of preventing erroneous writing due to malfunction can enhanced by making the logic levels of the two bits of the command the reverse of each other in terms of logic. Along with each bit representing the read/write command, a bit which is the reverse signal of the bit is transmitted to the disk drive at the same time. The disk drive checks to determine whether the bits of each of the two sets are the reverse of each other. If the two bits are not the reverse of each other, then an error is judged to have occurred and this is transmitted to the intermediate control device DKSW as machine-status information. By adopting this arrangement, the effect of preventing erroneous write can be enhanced even further.

The present invention is such that when the read/write operation continues over a plurality of tracks, the intermediate control device designates head advance by a specific bit of the read/write command. When head advance has been designated, the disk drive increments the present head address, which has been stored in a head-address register, to perform the reading/writing of data with respect to the next track. If this is adopted, the head is changed over to read/write data continuously even in a case where the read/write operation is performed over two or more tracks.

Furthermore, the present invention is such that when the device is idle, the intermediate control device sends a polling tag to each of the disk drives in succession via the downward control signal line. Each disk drive responds automatically to the polling tag by transmitting its own interrupt state to the intermediate control device via the upward control signal line. By adopting this arrangement, the intermediate control device is capable of recognizing, on the basis the interrupt, the end of the operation designated for the disk drive or the ready state of the disk drive. In this case, the intermediate control device performs monitoring to determine whether there is a response a prescribed period of time after the transmission of the polling tag. If there is no response, the intermediate control device judges that the disk apparatus does not exist and then sends the polling tag to the next disk drive. In a case where time is needed for the operation designated for the disk drive, the intermediate control device disconnects the disk drive and raises the order of priority of polling with respect to the disconnected disk drive. If this arrangement is adopted, the completion of the operation performed by the disconnected disk drive DK can be recognized promptly.

As many apparently widely different embodiments of the present invention can be made without departing from the spirit and scope thereof, it is to be understood that the invention is not limited to the specific embodiments thereof except as defined in the appended claims.

What is claimed is:

1. A disk subsystem having a disk apparatus equipped with n-number of disk drives which access disks in accordance with a command from a control device, and a higher order control device for controlling the disk drives by sending and receiving control information to and from the disk drives, said subsystem comprising:

a pair of control-information signal lines for daisy-chain connecting the control device with n-number of disk drives, one said control-information line sending serial information in a downward direction from the control device to the disk drives and the other said control-information line sending serial information in an upward direction from the disk drives to the control device;

serial communication means provided in the control device for sending and receiving the control information between the disk drives and the control device through said control-information signal lines in accordance with a serial interface;

serial communication means provided in each disk drive for sending and receiving the control information between the control device and the disk drives through said control-information signal lines in accordance with a serial interface;

said serial communication means provided in the control device including a driver connected to said downward control-information signal line and a receiver connected to said upward control-information signal line;

said serial communication means provided in each disk drive including a receiver connected to said downward control-information signal line and a driver connected to said upward control-information signal line;

wherein the control device has means for transmitting a start read/write command to a prescribed disk drive via the control-information signal line in the downward direction when data is read from and written to a disk, and when a valid tag, serving as an answer to the start read/write command has been received, for transmitting a read/write command to the disk drive via said control-information signal line in the downward direction; and each disk drive having means for transmitting a valid tag to the control device via the control-signal line in the upward direction when the start read/write command has been received and no error has occurred, and reading data from or writing data to the disk in response to reception of the read/write command.

2. The subsystem according to claim 1, wherein each disk drive further includes:

segment-pulse generating means which, when data on a track of the disk is divided into segments of a prescribed length, is for generating a segment pulse for each segment; and means for transmitting the segment pulse to the control device via said control-signal line in the upward direction in response to reception of the read/write command and halting the transmission of the segment pulse in response to discontinuation of the read/write command; and the control device further includes means for transmitting the read/write command to the disk drives whenever a segment pulse is received, until the reading and writing of data end.

3. The subsystem according to claim 2, wherein said segment-pulse generating means has means for inserting an index mark, which indicates the beginning of a track, in a train of the segment pulse; and the control device has an index sensing unit for identifying the beginning of a track by sensing the index mark inserted into the train of the segment pulse.

4. The subsystem according to claim 3, wherein the disk drive further includes:

a head-address register for indicating a present track position at which a read/write operation is to be performed;

means which, when a head advance has been designated by a specific bit of the read/write command, is for incrementing the present track address, which has been stored in said head-address register, and performing the reading of data from and the writing of data to the next track; and the control device further includes means which, when the index mark has been detected and the read/write operation continues, is for designating the head advance by a specific bit of the read/write command.

5. The subsystem according to claim 2, wherein each disk drive further includes:

means for detecting whether an error has occurred in response to the read/write command; and means for suspending transmission of the segment pulse when an error has occurred, maintaining said upward control-information signal line at the high level, and notifying the control device of the fact that an error has occurred in response to the read/write command.

6. The subsystem according to claim 1, wherein the read/write command is issued in the form of a combination of two bits.

7. The subsystem according to claim 6, wherein the logic levels of the two bits of the write command are the reverse of each other.

8. The subsystem according to claim 1, wherein the control device further includes means for simultaneously transmitting a first set of bits which indicate the read/write command, together with a second set of bits which are reverse signals of said first set of bits; and each disk drive further includes:

error monitoring means for checking whether the bits of each of said first and second sets are the reverse of each other and judging that an error has occurred when the bits of each of said first and second sets are not the reverse of each other; and means for transmitting the fact that an error has occurred to the controller as machine-status information.

9. A disk subsystem having a disk apparatus equipped with n-number of disk drives which access disks in accordance with a command from a control device, and a higher order control device for controlling the disk drives by sending and receiving control information to and from the disk drives, said subsystem comprising:

a pair of control-information signal lines for daisy-chain connecting the control device with n-number of disk drives, one said control-information line sending serial information in a downward direction from the control device to the disk drives and the other said control-information line sending serial information in an upward direction from the disk drives to the control device;

serial communication means provided in the control device for sending and receiving the control information between the disk drives and the control device through said control-information signal lines in accordance with a serial interface;

serial communication means provided in each disk drive for sending and receiving the control information between the control device and the disk drives through said control-information signal lines in accordance with a serial interface;

said serial communication means provided in the control device including a driver connected to said downward control-information signal and a receiver connected to said upward control-information signal line;

said serial communication means provided in each disk drive including a receiver connected to said downward control-information signal line and a driver connected to said upward control-information signal line;

m-number of higher order control devices for controlling said disk drives by sending and receiving control information to and from said disk drives; and m-pairs of control-information signal lines for daisy-chain connecting each control device of m-number of control devices with the n-number of disk drives, one said control-information line of each said pair sending information in a downward direction from a selected control device to the disk drives and the other said control-information line of each said pair sending information in an upward direction from the disk drives to a selected control device, said control-information lines transmitting control information in the form of a bit serial;

wherein each serial communication means provided in each disk drive includes m-number of receivers each of which is connected to respective one of m-number of downward control-information signal lines and m-number of drivers each of which is connected to respective one of the upward control-information signal lines.

10. A disk apparatus having n-number of disk drives which access disks in accordance with a command from a control device, comprising:

a pair of control-information signal lines for daisy-chain connecting the control device with n-number of disk drives, one said control-information line sending information in a downward direction from the control device to the disk drives and the other said control-information line sending information in an upward direction from the disk drives to the control device, said pair of control-information lines transmitting control information in the form of a bit serial;

serial communication means provided in each of the disk drives for sending and receiving the control information to and from the control device via said control-information signal lines in accordance with a serial interface;

said serial communication means provided in each disk drive including a receiver connected to said downward control-information signal line and a driver connected to said upward control-information signal line; and m-pairs of control-information signal lines for daisy-chain connecting each control device of m-number of control devices with the n-number of disk drives, one said control-information line of each said pair sending information in a downward direction from a selected control device to the disk drives and the other said control-information line of each said pair sending information in an upward direction from the disk drives to a selected control device, said control-information lines transmitting control information in the form of a bit serial;

wherein said serial communication means provided in each disk drive includes m-number of receivers each of which is connected to a respective one of said m-number of downward control-information signal lines, and m-number of drivers each of which is connected to a respective one of said upward control-information signal lines.

11. The disk apparatus according to claim 10, wherein said m-pairs of the control-information signal lines connected to each disk drive are divided into sets, each disk drive having one connector for each said set and m-number of control devices are connected to one disk drive via said connector.

12. The disk apparatus according to claim 10, wherein each disk drive has one connecting means for all of said control-information signal lines, said connecting means having a structure in which a connector on the side of the disk drive is connected to a connector on the side of the signal lines.

13. The disk apparatus according to claim 10, wherein said control-information signal lines are constructed by differential balanced-type transmission lines.

14. A disk subsystem having a disk apparatus equipped with n-number of disk drives which access disks in accordance with a command from a control device, and a higher order control device for controlling the disk drives by sending and receiving control information to and from the disk drives, said subsystem comprising:

a pair of control-information signal lines for daisy-chain connecting the control device with n-number of disk drives, one said control-information line sending serial information in a downward direction from the control device to the disk drives and the other said control-information line sending serial information in an upward direction from the disk drives to the control device;

serial communication means provided in the control device for sending and receiving the control information between the disk drives and the control device through said control-information signal lines in accordance with a serial interface;

serial communication means provided in each disk drive for sending and receiving the control information between the control device and the disk drives through said control-information signal lines in accordance with a serial interface;

said serial communication means provided in the control device including a driver connected to said downward control-information signal line and a receiver connected to said upward control-information signal line;

said serial communication means provided in each disk drive including a receiver connected to said downward control-information signal line and a driver connected to said upward control-information signal line;

wherein the control device includes means for transmitting a polling tag successively to each of the disk drives via said downward control-information signal line when the device is idle, and the disk drive has means for automatically responding to said polling tag by transmitting an interrupt state to the control device via said upward control-information signal line;

said control device recognizes, based upon the interrupt state of the disk drive, an end of an operation designated for said disk drive or ready state of said disk drive.

15. The subsystem according to claim 14, wherein the disk drive has means for automatically responding individually to polling tags from each of the control devices.

16. The subsystem according to claim 15, wherein the control device has a timer, monitors whether or not there is a response within a prescribed period of time following transmission of a polling tag and, in absence of a response, judges that there is no disk drive present and transmits a polling tag to the next disk drive.

17. The subsystem according to claim 14, wherein when the control device disconnects a disk drive, the control device raises the order of priority of polling with respect to the disk drive disconnected and recognizes an interrupt state of the disk drive.

18. A disk subsystem having a disk apparatus equipped with n-number of disk drives which access disks in accordance with a command from a control device, and a higher order control device for controlling the disk drives by sending and receiving control information to and from the disk drives, said subsystem comprising:

a pair of control-information signal lines for daisy-chain connecting the control device with n-number of disk drives, one said control-information line sending serial information in a downward direction from the control device to the disk drives and the other said control-information line sending serial information in an upward direction from the disk drives to the control device;

serial communication means provided in the control device for sending and receiving the control information between the disk drives and the control device through said control-information signal lines in accordance with a serial interface;

serial communication means provided in each disk drive for sending and receiving the control information between the control device and the disk drives through said control-information signal lines in accordance with a serial interface;

said serial communication means provided in the control device including a driver connected to said downward control-information signal line and a receiver connected to said upward control-information signal line;

said serial communication means provided in each disk drive including a receiver connected to said downward control-information signal line and a driver connected to said upward control-information signal line;

means for transmitting control information having a data bit string and a start bit placed at the beginning of the data bit string; and means for receiving the transmitted data bit string with synchronization being achieved by start-stop synchronization;

said serial communication means receiving the transmitted data bit string, and synchronization of said serial communication means being achieved by a clock pulse which is one-fourth the width of one bit.

* * * * *

UNITED STATES PATENT AND TRADEMARK OFFICE
CERTIFICATE OF CORRECTION

PATENT NO. : 5,765,040
DATED : June 9, 1998
INVENTOR(S) : Uno et al.

It is certified that error appears in the above-identified patent and that said Letters Patent is hereby corrected as shown below:

Column 1, line 48, delete "$3c_o$" and insert -- $3c_o\sim$ -- therefor

Column 8, line 14, delete "$RV_1$" and insert --$RV_{15}$-- therefor

Column 8, line 20, delete "DR" and insert --DK-- therefor

Column 12, line 35, delete "$11_3$" and insert --$11_{31}$-- therefor

Column 14, line 8, after "$L_{in}$" insert --in-- therefor

UNITED STATES PATENT AND TRADEMARK OFFICE
CERTIFICATE OF CORRECTION

PATENT NO. : 5,765,040
DATED : June 9, 1998
INVENTOR(S) : Uno et al.

It is certified that error appears in the above-identified patent and that said Letters Patent is hereby corrected as shown below:

Column 16, line 28, delete "a"(both occurrences) and insert --a--(both occurrences) therefor Column 20, line 4, delete "in line" and insert -- in-line -- therefor Column 25, line 33, after "signal" insert --line--

Signed and Sealed this

Twenty-ninth Day of September, 1998

Attest:

BRUCE LEHMAN

Attesting Officer     Commissioner of Patents and Trademarks